(12) United States Patent
Bernat et al.

(10) Patent No.: US 11,809,338 B2
(45) Date of Patent: Nov. 7, 2023

(54) SHARED MEMORY FOR INTELLIGENT NETWORK INTERFACE CARDS

(71) Applicant: Intel Corporation, Santa Clara, CA (US)

(72) Inventors: Francesc Guim Bernat, Barcelona (ES); Daniel Rivas Barragan, Cologne (DE); Kshitij A. Doshi, Tempe, AZ (US); Mark A. Schmisseur, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/492,928

(22) Filed: Oct. 4, 2021

(65) Prior Publication Data
US 2022/0204542 A1 Jun. 30, 2022

Related U.S. Application Data

(63) Continuation of application No. 15/475,216, filed on Mar. 31, 2017, now Pat. No. 11,157,422.

(51) Int. Cl.
G06F 12/00 (2006.01)
G06F 13/16 (2006.01)
(Continued)

(52) U.S. Cl.
CPC ...... G06F 13/1663 (2013.01); C07F 15/0033 (2013.01); G06F 12/082 (2013.01);
(Continued)

(58) Field of Classification Search
CPC ............... G06F 13/1663; G06F 12/082; G06F 12/0822; G06F 12/0831; G06F 12/1018;
(Continued)

(56) References Cited

U.S. PATENT DOCUMENTS 6,148,377 A * 11/2000 Carter ................ H04L 67/1097
711/E12.066
6,615,319 B2 9/2003 Khare et al.
(Continued)

FOREIGN PATENT DOCUMENTS

WO 2004025477 A2 3/2004

OTHER PUBLICATIONS

Extended European Search Report in European Patent Office Application No. 18154434.7 dated Jul. 24, 2018, 9 pages.
(Continued)

Primary Examiner — Shawn X Gu
(74) Attorney, Agent, or Firm — Patent Capital Group

(57) ABSTRACT

In an example, there is disclosed a host-fabric interface (HFI), including: an interconnect interface to communicatively couple the HFI to an interconnect; a network interface to communicatively couple the HFI to a network; network interface logic to provide communication between the interconnect and the network; a coprocessor configured to provide an offloaded function for the network; a memory; and a caching agent configured to: designate a region of the memory as a shared memory between the HFI and a core communicatively coupled to the HFI via the interconnect; receive a memory operation directed to the shared memory; and issue a memory instruction to the memory according to the memory operation.

25 Claims, 14 Drawing Sheets

(51) Int. Cl.
  *G06F 12/0817* (2016.01)
  *H04L 12/46* (2006.01)
  *C07F 15/00* (2006.01)
  *G06F 12/0831* (2016.01)
  *G06F 12/1018* (2016.01)
  *H04L 49/90* (2022.01)

(52) U.S. Cl.
  CPC ...... *G06F 12/0822* (2013.01); *G06F 12/0831* (2013.01); *G06F 12/1018* (2013.01); *H04L 12/4625* (2013.01); *H04L 49/9068* (2013.01); *G06F 2212/1024* (2013.01); *G06F 2212/621* (2013.01)

(58) Field of Classification Search
  CPC ....... G06F 2212/1024; G06F 2212/621; H04L 12/4625; H04L 49/9068; H04L 45/745; H04L 45/7457; H04L 12/5689
  See application file for complete search history.

(56) References Cited

U.S. PATENT DOCUMENTS

| | | | |
|---|---|---|---|
| 7,826,614 B1 | 11/2010 | Kaniz et al. | |
| 8,375,184 B2 * | 2/2013 | Kumar | G06F 11/2089 711/119 |
| 10,261,912 B2 * | 4/2019 | Coppola | G06F 12/1009 |
| 2002/0087804 A1 | 7/2002 | Khare et al. | |
| 2007/0266179 A1 | 11/2007 | Chavan et al. | |
| 2010/0095079 A1 | 4/2010 | Kang | |
| 2012/0102266 A1 | 4/2012 | Olsson et al. | |
| 2016/0140039 A1 | 5/2016 | Sodani et al. | |
| 2016/0170877 A1 | 6/2016 | Patsilaras et al. | |
| 2016/0337202 A1 * | 11/2016 | Ben-Itzhak | H04L 41/40 |
| 2017/0024352 A1 | 1/2017 | Lavasani | |

OTHER PUBLICATIONS

Final Office Action in U.S. Appl. No. 15/475,216 dated Oct. 8, 2020, 16 pages.
Non Final Office Action in U.S. Appl. No. 15/475,216 dated Apr. 24, 2020, 13 pages.
Non Final Office Action in U.S. Appl. No. 15/475,216 dated Feb. 10, 2021, 15 pages.
Notice of Allowance in U.S. Appl. No. 15/475,216 dated Jun. 28, 2021, 7 pages.

* cited by examiner

SHARED MEMORY FOR INTELLIGENT NETWORK INTERFACE CARDS

CROSS REFERENCE TO RELATED APPLICATIONS

This Application is a continuation (and claims the benefit of priority under 35 U.S.C. § 120) of U.S. application Ser. No. 15/475,216, filed Mar. 31, 2017 and entitled SHARED MEMORY FOR INTELLIGENT NETWORK INTERFACE CARDS, issued as U.S. Pat. No. 11,057,422, issued 26 Oct. 2021. The disclosure of the prior application, and the issued patent, are considered part of and are incorporated by reference in the disclosure of this Application

FIELD OF THE SPECIFICATION

This disclosure relates in general to the field of cloud computing, and more particularly, though not exclusively to, a system and method for shared memory for intelligent network interface cards.

BACKGROUND

Contemporary computing practice has moved away from hardware-specific computing and toward "the network is the device." A contemporary network may include a data center hosting a large number of generic hardware server devices, contained in a server rack for example, and controlled by a hypervisor. Each hardware device may run one or more instances of a virtual device, such as a workload server or virtual desktop.

In some cases, a virtualized network may also include Network Function Virtualization (NFV), which provides certain network functions as virtual appliances. These functions may be referred to as Virtual Network Functions (VNFs). In the past, the functions provided by these VNFs may have been provided by bespoke hardware service appliances.

Thus, in a contemporary "cloud" architecture, both network endpoints and network infrastructure may be at least partially provided in a virtualization layer.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1A:
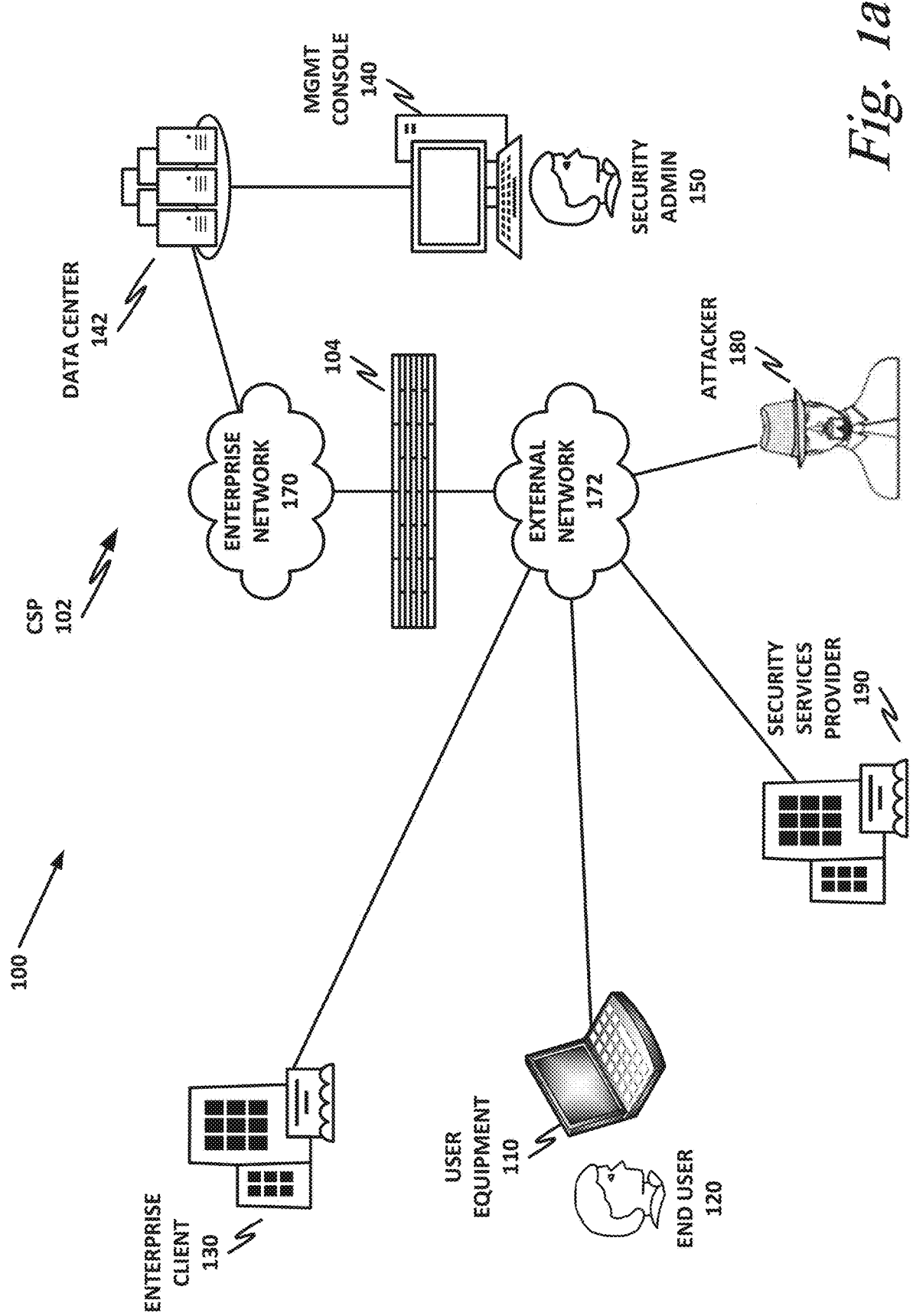
FIG. 1a is a block diagram of a network according to one or more examples of the present specification.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

In modern computing, and especially in enterprise computing, it is sometimes said that "the data center is the machine." In a data center, a large number of identical or nearly identical rackmount or blade servers may be deployed, with each one being treated as a line replaceable unit. If a particular device fails, it is often more economical to simply replace it than to try to repair it.

In this modern computing paradigm, data latency and data bandwidth are key performance indicators that greatly affect the ability of a data center to meet its QoS and SLA requirements or targets. This becomes an even greater concern as many datacenter resources are offloaded to specific, high-volume devices. As an illustrative example, a processor may have some local cache, but rather than a local DRAM, the local cache may interface with and write to a memory to an Intel® 3D cross point (3DXP) memory server providing persistent memory at near DRAM speeds, which may be located locally, or on a dedicated memory server. Similarly, while it is possible for storage to be local to the device, storage could also be offloaded to a storage pool, such as a RAID, RAIN, or other similar storage architecture.

This being the case, the interconnections between the various devices become increasingly important. To that end, a high-speed fabric may be provided to communicatively couple the various devices. The fabric may be a high-speed switching fabric, such as Intel® OmniPath, or it may be a more traditional network, such as high-speed Ethernet or Infiniband. Throughout this specification, the term "fabric"

should be understood to refer to any suitable fabric, interconnect, or bus between the various components of a data center.

Thus, in contrast to all-in-one devices, where the network interface simply provided a medium for different machines to communicate with one another, in a data center the fabric and its associated network interface may be an integral part of a data center "machine." Throughout this specification a "network interface" should be understood to encompass any device that couples the compute resources to the fabric, such as a network interface card (NIC), a host fabric interface (HFI), or similar.

In a modern architecture, the network interface may be closely coupled with the processor. In fact, in many cases, the network interface is provided as an integrated, on-die component to ensure that the processor and the network interface realize very high speed communication to increase bandwidth and reduce latency. In other embodiments, a separate HFI chip may be provided as a peripheral to the processor core.

Another improvement in data center architecture is the so-called "intelligent NIC", in which a coprocessor is added to the network interface to provide some compute-intensive and repetitive network functions. The provision of a coprocessor on a NIC may be a beneficial ingredient for improving performance of the NIC and reducing Total Cost of Ownership (TCO). The task performed by the coprocessor may be, by way of nonlimiting example, encryption, IP security (IPsec), compression, or some other highly repetitive task.

The coprocessor itself may take the form of an Application-Specific Integrated Circuit (ASIC), a Field-Programmable Gate Array (FPGA), a dedicated IP block, or some other tightly coupled hardware and/or software solution that offloads these repetitive tasks from the CPU. As used throughout this specification, a "coprocessor" as applied to a NIC should be understood to include any dedicated hardware, software, firmware, or combination of those solutions that offloads a task from the CPU.

While the NIC itself realizes benefits to the architecture, the NIC still maintains a peripheral role in relation to the CPU. When a programmer codes an algorithm into the CPU, the programmer remains keenly aware of when certain computation processes require communication across the NIC. As the programmer remains aware of this, he may need to break the computation into certain non-streamlined operations, which may be divided by such acts as sends, receives, handshakes, polling, dispatch, exception handling, or similar. These rigid boundaries between compute operations and communication operations inhibit the flexibility and performance of the program. As described above, in the particular example of a data center, latency and bandwidth are performance indicia that a system designer may seek to optimize.

It is advantageous, therefore, to expand the role of a NIC so that its operations are streamlined into the flow of the CPU's operations, thus bringing the NIC even closer, logically, to the CPU than is provided by existing architectures. Rather than issuing network operations like "send" and "receive," the programmer can simply read to and write from a fast memory block, with communication happening in the background.

To improve the value of a NIC, the present specification provides a system and method in which computing and communication tasks may be streamlined into cooperative operations without disturbing architectural flexibility of the physical arrangement of the NIC logic. In one example, this is achieved by augmenting a smart NIC with the additional capability of providing a shared memory space with the CPU.

Specifically, the NIC of the present specification provides a memory range in the system address space of the compute node. Addresses in this range are mapped to a section of DRAM memory for the coprocessor of the NIC. The NIC coprocessor exposes these memory addresses to the compute host so that they can have shared access.

At a high level, this allows direct, memory-based communication between the coprocessor and the CPU. Thus, when an algorithm is executing software in the CPU, or conversely, when the coprocessor is providing a data flow, they can share those data and signal events via the shared memory region. It should be noted that the shared memory space is actually hosted in the DRAM of the coprocessor, so that when a Caching Agent (CA) of the compute host writes to or reads from the shared memory space, a transaction occurs in which the read or write is transferred to the shared memory space via the interconnect between the two. This may be via dedicated lanes in an on-die NIC, or it may be via PCIe (Peripheral Component Interconnect express) channels in a case where the NIC is offboard from the cores. It should be noted that the examples in the FIGURES below illustrate an example in which the interconnect between the NIC and the core is a PCIe interface, but this is a nonlimiting example. As used throughout the specification and the claims, the interconnect may be any suitable interconnect, including an on-die interconnect.

The coherency of the shared memory space may be managed by a caching agent provided on the NIC. When a core in the compute host issues a memory operation to the shared address space, the caching agent for the core issues a request to the caching agent for the coprocessor via the interconnect. The caching agent on the NIC may then handle the memory operation.

In terms of CPU architecture, the local caching agent to the CPU sees and treats the interfaced NIC as another QPI or PCIe agent. Thus, in certain embodiments, it may be unnecessary to make changes to the caching agent located on the cores, or to the cores themselves. Rather, a PCIe agent tunnels memory access requests to the NIC's shared memory via the distinctive address range over a PCIe lane dedicated to tunneling coherent traffic to the NIC. Thus, changes may be made to the PCIe interfaces, as well as to the caching agent on the NIC.

When a memory request arrives at a host PCIe interface in the NIC, the interface directs the shared memory access request to the caching agent of the NIC's coprocessor. This caching agent is communicatively coupled to the memory controller that manages the shared DRAM. This caching agent manages the lines within the shared DRAM and controls who "owns" the lines (e.g., a CPU cache or the coprocessor). The caching agent also manages the status of each memory location, which may follow a protocol such as MESI (Modified/Exclusive/Shared/Invalid). MESI is a known cache coherency protocol that is an improvement on MSI (MESI without exclusivity), which substantially reduces the number of required memory transactions. Other examples may employ, for example, MSI, MOSI (Modified/Owned/Shared/Invalid), or MOESI (MOSI with exclusivity).

When a memory operation occurs, the caching agent processes the request and takes the appropriate action to maintain coherency between the core and the coprocessor. This may include, for example, awarding ownership of a line to the CPU, snooping as needed, reading data from the memory controller as needed, sending data back to the requested node together with the state, or other similar operations.

Note that in this example, one caching agent and one dedicated PCIe line are described for the sake of simplicity of the illustration. But in practice, the number of caching agents and PCIe lanes that are implemented may be driven by the performance, power, and cost considerations of a particular deployment.

Note that in some examples, a shared memory may be federated across multiple NICs. In this case, a System Address Decoder (SAD) may be added to the PCIe agent of the compute node. This SAD lets the agent federate the NIC-based shared DRAMs into the host memory space for seamless access. The PCIe agent routes memory accesses that originate anywhere in the system and that target a memory block in a particular NIC to that NIC. Thus, each NIC may access the shared DRAM of a peer NIC, and use it to coordinate event flows and perform communication and notification tasks autonomously, thus bypassing any intervention from the CPU, which would require other control paths for control, exception, and error handling. Where multiple NICs share memory, a hashing function may be used to home a particular memory operation.

In an embodiment, there may also be provided a novel snoop filter and caching agent scheme located in the NIC and integrated into the PCIe node agent to optimize the communication volume to perform coherent communications between both types of agents.

Note that this architecture may be used not only to create a coherent address space between the CPU and the NIC, but may also be used to establish a coherent address space between different NICs connected through the PCIe node agent. In this case, the address space may be partitioned between the different NICs, and the PCIe node agent reroutes requests from the NICs and CPUs to the corresponding NIC owning that particular address space. This enables novel use cases in which the memory addresses are shared between multiple NICs and multiple CPUs.

A system and method for shared memory for intelligent network interface cards will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1a is a network-level diagram of a network 100 of a Cloud Service Provider (CSP) 102 according to one or more examples of the present specification. In the example of FIG. 1a, network 100 may be configured to enable one or more enterprise clients 130 to provide services or data to one or more end users 120, who may operate user equipment 110 to access information or services via external network 172. This example contemplates an embodiment in which a cloud service provider 102 is itself an enterprise that provides third-party "network as a service" (NaaS) to enterprise client 130. However, this example is nonlimiting. Enterprise client 130 and CSP 102 could also be the same or a related entity in appropriate embodiments.

Enterprise network 170 may be any suitable network or combination of one or more networks operating on one or more suitable networking protocols, including for example, a fabric, a local area network, an intranet, a virtual network, a wide area network, a wireless network, a cellular network, or the Internet (optionally accessed via a proxy, virtual machine, or other similar security mechanism) by way of nonlimiting example. Enterprise network 170 may also include one or more servers, firewalls, routers, switches, security appliances, antivirus servers, or other useful network devices, which in an example may be virtualized within data center 142. In this illustration, enterprise network 170 is shown as a single network for simplicity, but in some embodiments, enterprise network 170 may include a large number of networks, such as one or more enterprise intranets connected to the Internet, and may include data centers in a plurality of geographic locations. Enterprise network 170 may also provide access to an external network, such as the Internet, via external network 172. External network 172 may similarly be any suitable type of network.

A data center 142 may be provided, for example as a virtual cluster running in a hypervisor on a plurality of rackmounted blade servers, or as a cluster of physical servers. Data center 142 may provide one or more server functions, one or more VNFs, or one or more "microclouds" to one or more tenants in one or more hypervisors. For example, a virtualization environment such as vCenter may provide the ability to define a plurality of "tenants," with each tenant being functionally separate from each other tenant, and each tenant operating as a single-purpose microcloud. Each microcloud may serve a distinctive function, and may include a plurality of Virtual Machines (VMs) of many different flavors. In some embodiments, data center 142 may also provide multitenancy, in which a single instance of a function may be provided to a plurality of tenants, with data for each tenant being insulated from data for each other tenant.

It should also be noted that some functionality of User Equipment (UE) 110 may also be provided via data center 142. For example, one microcloud may provide a remote desktop hypervisor such as a Citrix workspace, which allows end users 120 to remotely log in to a remote enterprise desktop and access enterprise applications, workspaces, and data. In that case, UE 110 could be a "thin client" such as a Google Chromebook, running only a stripped-down operating system, and still provide user 120 useful access to enterprise resources.

One or more computing devices configured as a management console 140 may also operate on enterprise network 170. Management console 140 may be a special case of user equipment, and may provide a user interface for a security administrator 150 to define enterprise security and network policies, which management console 140 may enforce on enterprise network 170 and across client devices 110 and data center 142. In an example, management console 140 may run a server-class operating system, such as Linux, Unix, or Windows Server. In another case, management console 140 may be provided as a web interface, on a desktop-class machine, or via a VM provisioned within data center 142.

Network 100 may communicate across enterprise boundary 104 with external network 172. Enterprise boundary 104 may represent a physical, logical, or other boundary. External network 172 may include, for example, websites, servers, network protocols, and other network-based services. CSP 102 may also contract with a third-party security services provider 190, such as McAfee® or another security services enterprise, to provide security services to network 100.

It may be a goal of enterprise clients to securely provide network services to end users 120 via data center 142, as hosted by CSP 102. To that end, CSP 102 may provide certain contractual Quality of Service (QoS) guarantees and/or Service Level Agreements (SLAs). QoS may be a measure of resource performance, and may include factors such as availability, jitter, bit rate, throughput, error rates, and latency, to name just a few. An SLA may be a contractual agreement that may include QoS factors, as well as factors such as "Mean Time To Recovery" (MTTR) and Mean Time Between Failure (MTBF). In general, an SLA may be a higher-level agreement that is more relevant to an overall experience, whereas QoS may be used to measure the performance of individual components. However, this should not be understood as implying a strict division between QoS metrics and SLA metrics.

Figure 1B:
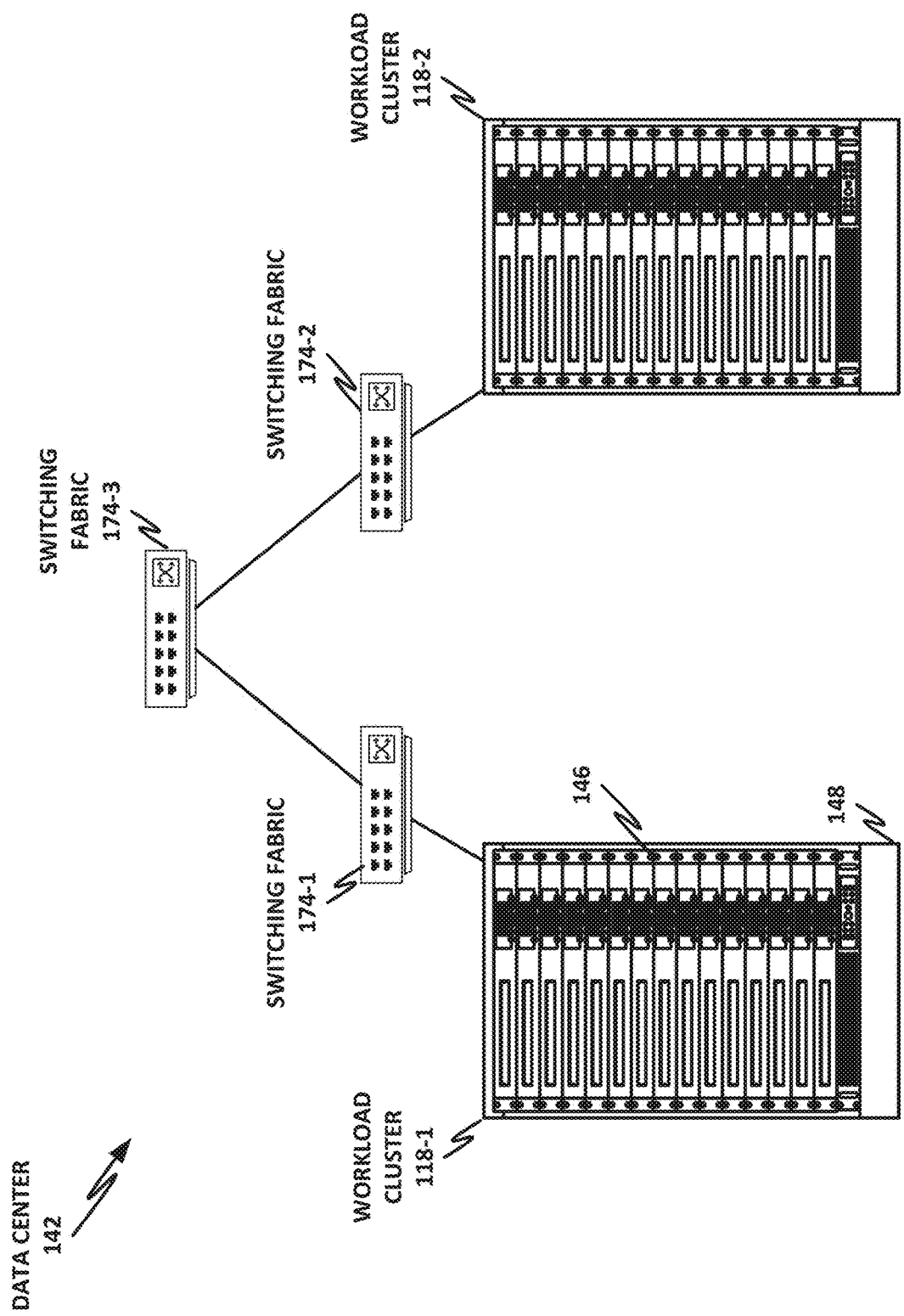
FIG. 1b is a block diagram of selected components of a data center in the network according to one or more examples of the present specification.

Turning to FIG. 1b, to meet contractual QoS and SLA requirements, CSP 102 may provision some number of workload clusters 118. In this example, two workload clusters, 118-1 and 118-2 are shown, each providing up to 16 rackmount servers 146 in a chassis 148. These server racks may be collocated in a single data center, or may be located in different geographic data centers. Depending on the contractual agreements, some servers 146 may be specifically dedicated to certain enterprise clients or tenants, while others may be shared.

Selection of a number of servers to provision in a data center is an exercise for CSP 102. CSP 102 may wish to ensure that there are enough servers to handle network capacity, and to provide for anticipated device failures over time. However, provisioning too many servers 146 can be costly both in terms of hardware cost, and in terms of power consumption. Thus, ideally, CSP 102 provisions enough servers 146 to service all of its enterprise clients 130 and meet contractual QoS and SLA benchmarks, but not have wasted capacity.

The various devices in data center 142 may be connected to each other via a switching fabric. The "fabric" is often referred to and treated as a single entity, but it should be understood that in some embodiments, the fabric is a high-level label for a plurality of devices that may operate together to form the fabric. For example, a fabric may include one or more high speed routing and/or switching devices 174. In some cases, switching devices 174 may be hierarchical, with for example, switch 174-1 handling workload cluster 118-1, switch 174-2 handling workload cluster 118-2, and switch 174-3. This simple hierarchy is shown to illustrate the principle of hierarchical switching fabrics, but it should be noted that this may be significantly simplified compared to real-life deployments. In many cases, the hierarchy of switching fabric 174 may be multifaceted and much more involved. Common network architectures include hub-and-spoke architectures, and leaf-spine architectures.

The fabric itself may be provided by any suitable interconnect technology, such as Intel® OmniPath™, TrueScale™, Ultra Path Interconnect (UPI) (formerly called QPI or KTI), STL, Ethernet, PCI, or PCIe, to name just a few. Some of these will be more suitable for certain types of deployments than others, and selecting an appropriate fabric for the instant application is an exercise of ordinary skill.

Figure 2:
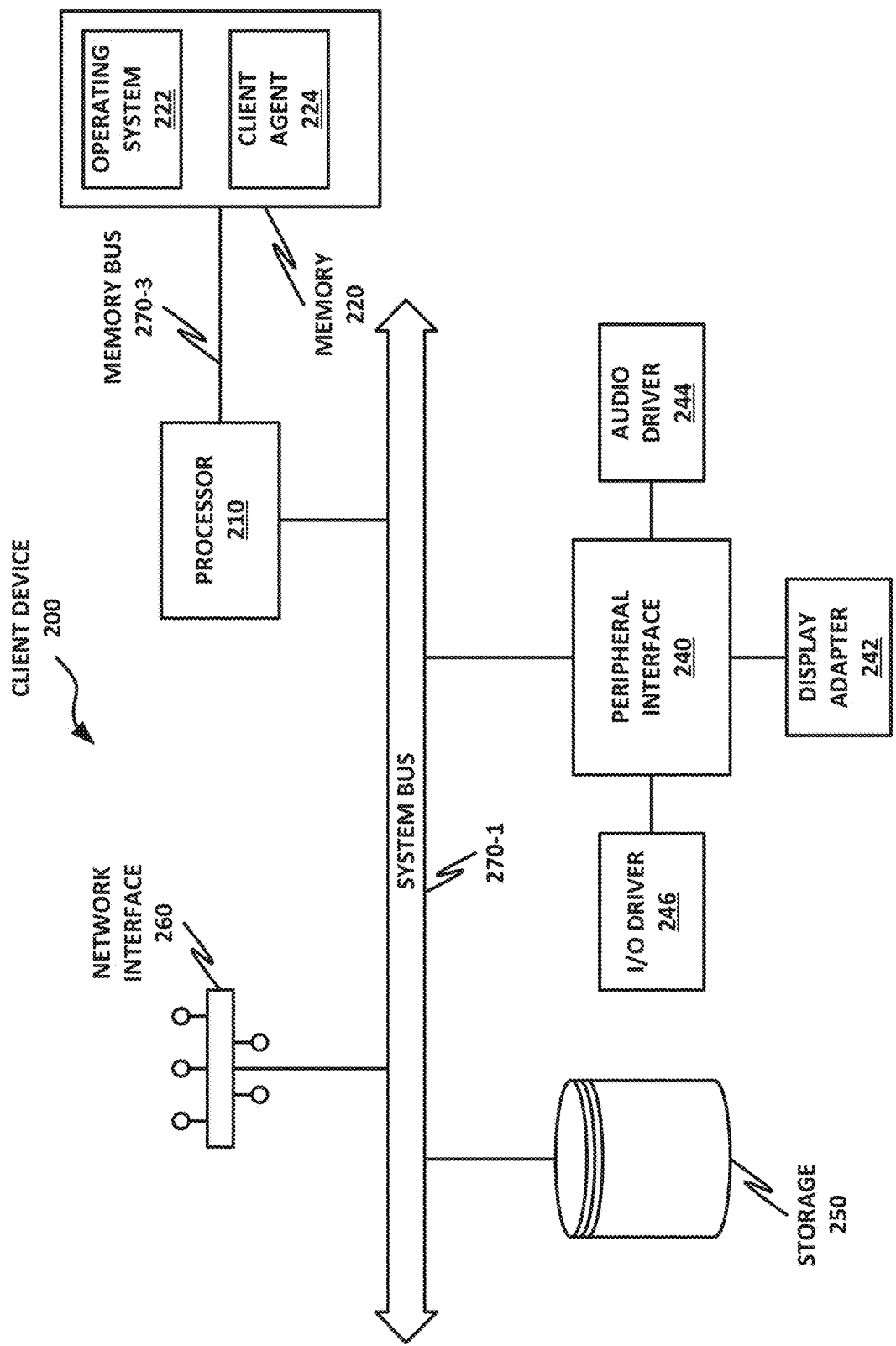
FIG. 2 is a block diagram of selected components of an end-user computing device according to one or more examples of the present specification.

FIG. 2 is a block diagram of client device 200 according to one or more examples of the present specification. Client device 200 may be any suitable computing device. In various embodiments, a "computing device" may be or comprise, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it may be designated as a "remote host." In one particular example, client device 200 is a virtual machine configured for RDMA (Remote Direct Memory Access) as described herein.

Client device 200 includes a processor 210 connected to a memory 220, having stored therein executable instructions for providing an operating system 222 and at least software portions of a client agent 224. Other components of client device 200 include a storage 250, network interface 260, and peripheral interface 240. This architecture is provided by way of example only, and is intended to be nonexclusive and nonlimiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices, such as in the case of a data center storage pool or memory server. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block.

As used throughout this specification, "logic elements" may include hardware (including, for example, a programmable software, ASIC, or FPGA), external hardware (digital, analog, or mixed-signal), software, reciprocating software, services, drivers, interfaces, components, modules, algorithms, sensors, components, firmware, microcode, programmable logic, or objects that can coordinate to achieve a logical operation. Furthermore, some logic elements are provided by a tangible, nontransitory computer-readable medium having stored thereon executable instructions for instructing a processor to perform a certain task. Such a nontransitory medium could include, for example, a hard disk, solid state memory or disk, Read-Only Memory (ROM), Persistent Fast Memory (PFM) (e.g., Intel® 3D Crosspoint), external storage, Redundant Array of Independent Disks (RAID), Redundant Array of Independent Nodes (RAIN), Network-Attached Storage (NAS), optical storage, tape drive, backup system, cloud storage, or any combination of the foregoing by way of nonlimiting example. Such a medium could also include instructions programmed into an FPGA, or encoded in hardware on an ASIC or processor.

In an example, processor 210 is communicatively coupled to memory 220 via memory bus 270-3, which may be for example a Direct Memory Access (DMA) bus by way of example, though other memory architectures are possible, including ones in which memory 220 communicates with processor 210 via system bus 270-1 or some other bus. In data center environments, memory bus 270-3 may be, or may include, the fabric.

Processor 210 may be communicatively coupled to other devices via a system bus 270-1. As used throughout this specification, a "bus" includes any wired or wireless interconnection line, network, connection, fabric, bundle, single bus, multiple buses, crossbar network, single-stage network, multistage network, or other conduction medium operable to carry data, signals, or power between parts of a computing device, or between computing devices. It should be noted that these uses are disclosed by way of nonlimiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of nonlimiting example a microprocessor, Digital Signal Processor (DSP), Field-Programmable Gate Array (FPGA), Graphics Processing Unit (GPU), Programmable Logic Array (PLA), Application-Specific Integrated Circuit (ASIC), or Virtual Machine Processor (VMP). In certain architectures, a multicore processor may be provided, in which case processor 210 may be treated as only one core of a multicore processor, or may be treated as the entire multicore processor, as appropriate. In some embodiments, one or more coprocessors may also be provided for specialized or support functions.

Processor 210 may be connected to memory 220 in a DMA configuration via bus 270-3. To simplify this disclosure, memory 220 is disclosed as a single logical block, but in a physical embodiment may include one or more blocks of any suitable volatile or nonvolatile memory technology or technologies, including for example Double Data Rate Random-Access Memory (DDR RAM), Static Random-Access Memory (SRAM), Dynamic Random-Access Memory (DRAM), Persistent Fast Memory (PFM) such as Intel® 3D Crosspoint (3DXP), cache, L1 or L2 memory, on-chip memory, registers, flash, Read-Only Memory (ROM), optical media, virtual memory regions, magnetic or tape memory, or similar. Memory 220 may be provided locally, or may be provided elsewhere, such as in the case of a data center with a 3DXP memory server. In certain embodiments, memory 220 may comprise a relatively low-latency volatile main memory, while storage 250 may comprise a relatively higher-latency nonvolatile memory. However, memory 220 and storage 250 need not be physically separate devices, and in some examples may represent simply a logical separation of function. These lines can be particularly blurred in cases where the only long-term memory is a battery-backed RAM, or where the main memory is provided as PFM. It should also be noted that although DMA is disclosed by way of nonlimiting example, DMA is not the only protocol consistent with this specification, and that other memory architectures are available.

Operating system 222 may be provided, though it is not necessary in all embodiments. For example, some embedded systems operate on "bare metal" for purposes of speed, efficiency, and resource preservation. However, in contemporary systems, it is common for even minimalist embedded systems to include some kind of operating system. Where it is provided, operating system 222 may include any appropriate operating system, such as Microsoft Windows, Linux, Android, Mac OSX, Apple iOS, Unix, or similar. Some of the foregoing may be more often used on one type of device than another. For example, desktop computers or engineering workstations may be more likely to use one of Microsoft Windows, Linux, Unix, or Mac OSX. Laptop computers, which are usually a portable off-the-shelf device with fewer customization options, may be more likely to run Microsoft Windows or Mac OSX. Mobile devices may be more likely to run Android or iOS. Embedded devices often use an embedded Linux or a dedicated embedded OS such as VxWorks. However, these examples are not intended to be limiting.

Storage 250 may be any species of memory 220, or may be a separate nonvolatile memory device. Storage 250 may include one or more nontransitory computer-readable mediums, including, by way of nonlimiting example, a hard drive, solid-state drive, external storage, Redundant Array of Independent Disks (RAID), Redundant Array of Independent Nodes (RAIN), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of client agent 224. In some examples, storage 250 may be a nontransitory computer-readable storage medium that includes hardware instructions or logic encoded as processor instructions or on an ASIC. Many other configurations are also possible, and are intended to be encompassed within the broad scope of this specification.

Network interface 260 may be provided to communicatively couple client device 200 to a wired or wireless network. A "network," as used throughout this specification, may include any communicative platform or medium operable to exchange data or information within or between computing devices, including by way of nonlimiting example, Ethernet, WiFi, a fabric, an ad-hoc local network, an internet architecture providing computing devices with the ability to electronically interact, a Plain Old Telephone System (POTS), which computing devices could use to perform transactions in which they may be assisted by human operators or in which they may manually key data into a telephone or other suitable electronic equipment, any Packet Data Network (PDN) offering a communications interface or exchange between any two nodes in a system, or any Local Area Network (LAN), Metropolitan Area Network (MAN), Wide Area Network (WAN), Wireless Local Area Network (WLAN), Virtual Private Network (VPN), intranet, or any other appropriate architecture or system that facilitates communications in a network or telephonic environment. Note that in certain embodiments, network interface 260 may be, or may include, a Host Fabric Interface (HFI).

Client agent 224 may be a client application that accesses a function provided by the data center, such as search services. In one example, client agent 224 is operable to carry out computer-implemented methods as described in this specification. Client agent 224 may include one or more tangible nontransitory computer-readable mediums having stored thereon executable instructions operable to instruct a processor to provide a client agent 224. Client agent 224 may also include a processor, with corresponding memory instructions that instruct the processor to carry out the desired method. As used throughout this specification, an "engine" includes any combination of one or more logic elements, of similar or dissimilar species, operable for and configured to perform one or more methods or functions of the engine. In some cases, client agent 224 may include a special integrated circuit designed to carry out a method or a part thereof, and may also include software instructions operable to instruct a processor to perform the method. In some cases, client agent 224 may run as a "daemon" process. A "daemon" may include any program or series of executable instructions, whether implemented in hardware, software, firmware, or any combination thereof that runs as a background process, a terminate-and-stay-resident program, a service, system extension, control panel, bootup procedure, Basic Input/Output System (BIOS) subroutine, or any similar program that operates without direct user interaction. In certain embodiments, daemon processes may run with elevated privileges in a "driver space" associated with ring 0, 1, or 2 in a protection ring architecture. It should also be noted that client agent 224 may also include other hardware and software, including configuration files, registry entries, and interactive or user-mode software by way of non-limiting example.

In one example, client agent 224 includes executable instructions stored on a nontransitory medium operable to perform a method according to this specification. At an appropriate time, such as upon booting client device 200, or upon a command from operating system 222 or a user 120, processor 210 may retrieve a copy of the instructions from storage 250 and load it into memory 220. Processor 210 may then iteratively execute the instructions of client agent 224 to provide the desired method.

Peripheral interface 240 may be configured to interface with any auxiliary device that connects to client device 200 but that is not necessarily a part of the core architecture of client device 200. A peripheral may be operable to provide extended functionality to client device 200, and may or may not be wholly dependent on client device 200. In some cases, a peripheral may be a computing device in its own right. Peripherals may include input and output devices such as displays, terminals, printers, keyboards, mice, modems, data ports (e.g., serial, parallel, Universal Serial Bus (USB), Firewire, or similar), network controllers, optical media, external storage, sensors, transducers, actuators, controllers, data acquisition buses, cameras, microphones, speakers, or external storage by way of nonlimiting example.

In one example, peripherals include display adapter 242, audio driver 244, and Input/Output (I/O) driver 246. Display adapter 242 may be configured to provide a human-readable visual output, such as a Command-Line Interface (CLI) or graphical desktop such as Microsoft Windows, Apple OSX desktop, or a Unix/Linux "x" Windows System-based desktop. Display adapter 242 may provide output in any suitable format, such as a coaxial output, composite video, component video, Video Graphics Array (VGA), or digital outputs such as Digital Video Interface (DVI), or High-Definition Multimedia Interface (HDMI), by way of nonlimiting example. In some examples, display adapter 242 may include a hardware graphics card, which may have its own memory and its own Graphics Processing Unit (GPU). Audio driver 244 may provide an interface for audible sounds, and may include in some examples a hardware sound card. Sound output may be provided in analog (such as a 3.5 mm stereo jack), component ("RCA") stereo, or in a digital audio format such as Sony/Philips Digital Interface Format (S/PDIF), (Audio Engineering Society-3 (AES3), Audio Engineering Society-47 (AES47), HDMI, USB, Bluetooth or Wi-Fi audio, by way of nonlimiting example. Note that in embodiments where client device 200 is a virtual machine, peripherals may be provided remotely by a device used to access the virtual machine.

Figure 3:
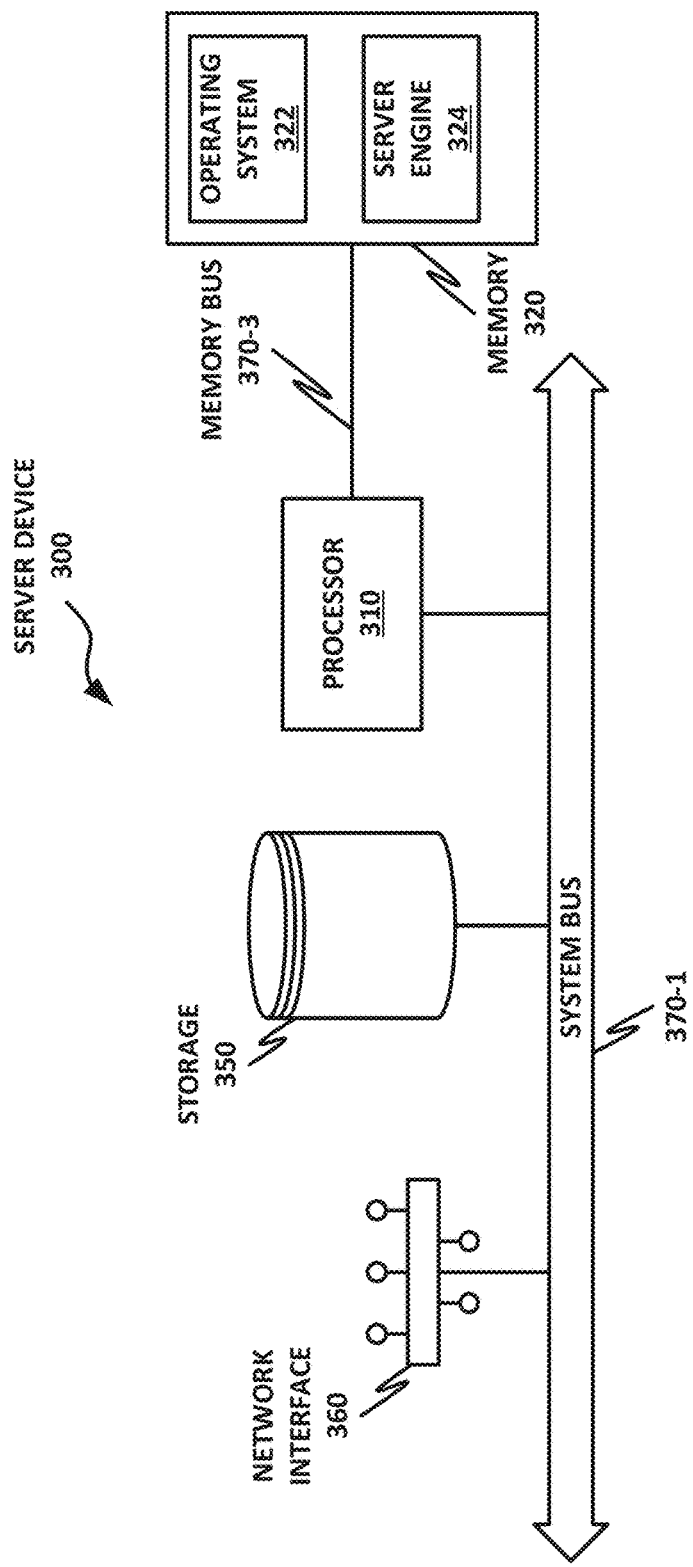
FIG. 3 is a high-level block diagram of a server according to one or more examples of the present specification.

FIG. 3 is a block diagram of a server-class device 300 according to one or more examples of the present specification. Server 300 may be any suitable computing device, as described in connection with FIG. 2. In general, the definitions and examples of FIG. 2 may be considered as equally applicable to FIG. 3, unless specifically stated otherwise. Server 300 is described herein separately to illustrate that in certain embodiments, logical operations may be divided along a client-server model, wherein client device 200 provides certain localized tasks, while server 300 provides certain other centralized tasks.

Note that server 300 of FIG. 3 illustrates in particular the classic "Von Neumann Architecture" aspects of server 300, with a focus on functional blocks. Other FIGURES herein (e.g., FIGS. 4a, 4b, and 5 below) may illustrate other aspects of a client or server device, with more focus on virtualization aspects. These illustrated embodiments are not intended to be mutually exclusive or to infer a necessary distinction. Rather, the various views and diagrams are intended to illustrate different perspectives and aspects of these devices.

In a particular example, server device 300 may be a memory server as illustrated herein.

Server 300 includes a processor 310 connected to a memory 320, having stored therein executable instructions for providing an operating system 322 and at least software portions of a server engine 324. Server engine 324 may provide a function of the data center, such as search services. Other components of server 300 include a storage 350, and host fabric interface 360. As described in FIG. 2, each logical block may be provided by one or more similar or dissimilar logic elements.

In an example, processor 310 is communicatively coupled to memory 320 via memory bus 370-3, which may be for example a Direct Memory Access (DMA) bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type. Memory 320 may include a persistent fast memory, such as 3DXP or similar.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of server engine 324.

Host Fabric Interface (HFI) 360 may be provided to communicatively couple server 300 to a wired or wireless network, including a host fabric. A host fabric may include a switched interface for communicatively coupling nodes in a cloud or cloud-like environment. HFI 360 is used by way of example here, though any other suitable network interface (as discussed in connection with network interface 260) may be used.

Server engine 324 is an engine as described in FIG. 2 and, in one example, includes one or more logic elements operable to carry out computer-implemented methods as described in this specification. Software portions of server engine 324 may run as a daemon process.

Server engine 324 may include one or more nontransitory computer-readable mediums having stored thereon executable instructions operable to instruct a processor to provide server engine 324. At an appropriate time, such as upon booting server 300 or upon a command from operating system 322 or a user 120 or security administrator 150, processor 310 may retrieve a copy of server engine 324 (or software portions thereof) from storage 350 and load it into memory 320. Processor 310 may then iteratively execute the instructions of server engine 324 to provide the desired method.

Figure 4A:
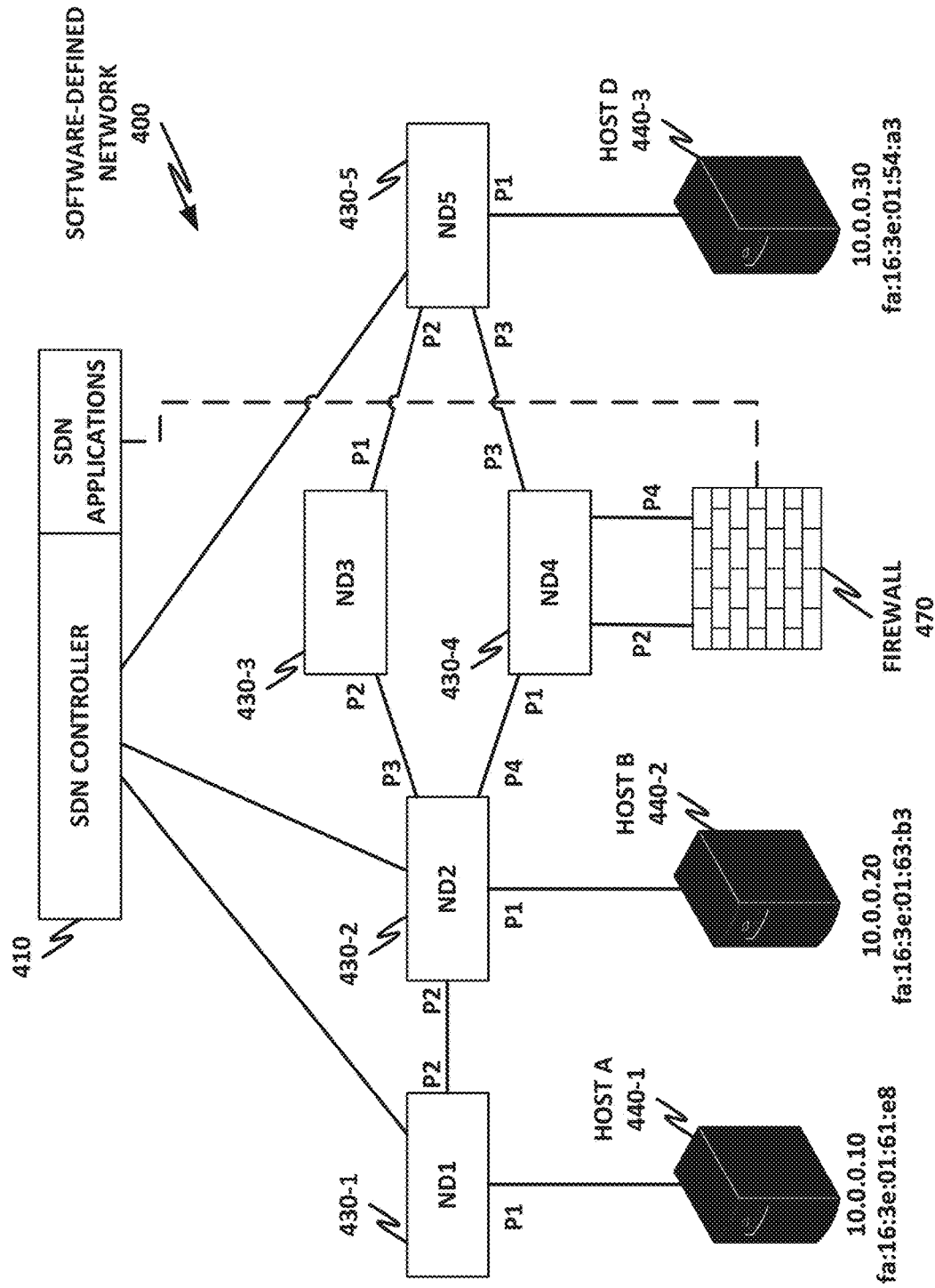
FIG. 4a is a block diagram of software-defined networking (SDN) according to one or more examples of the present specification.

FIG. 4a is a block diagram of a software-defined network 400. In Software Defined Networking (SDN), a data plane is separated from a control plane to realize certain advantages. SDN is only one flavor of virtualization, shown here to illustrate one option for a network setup.

Figure 4B:
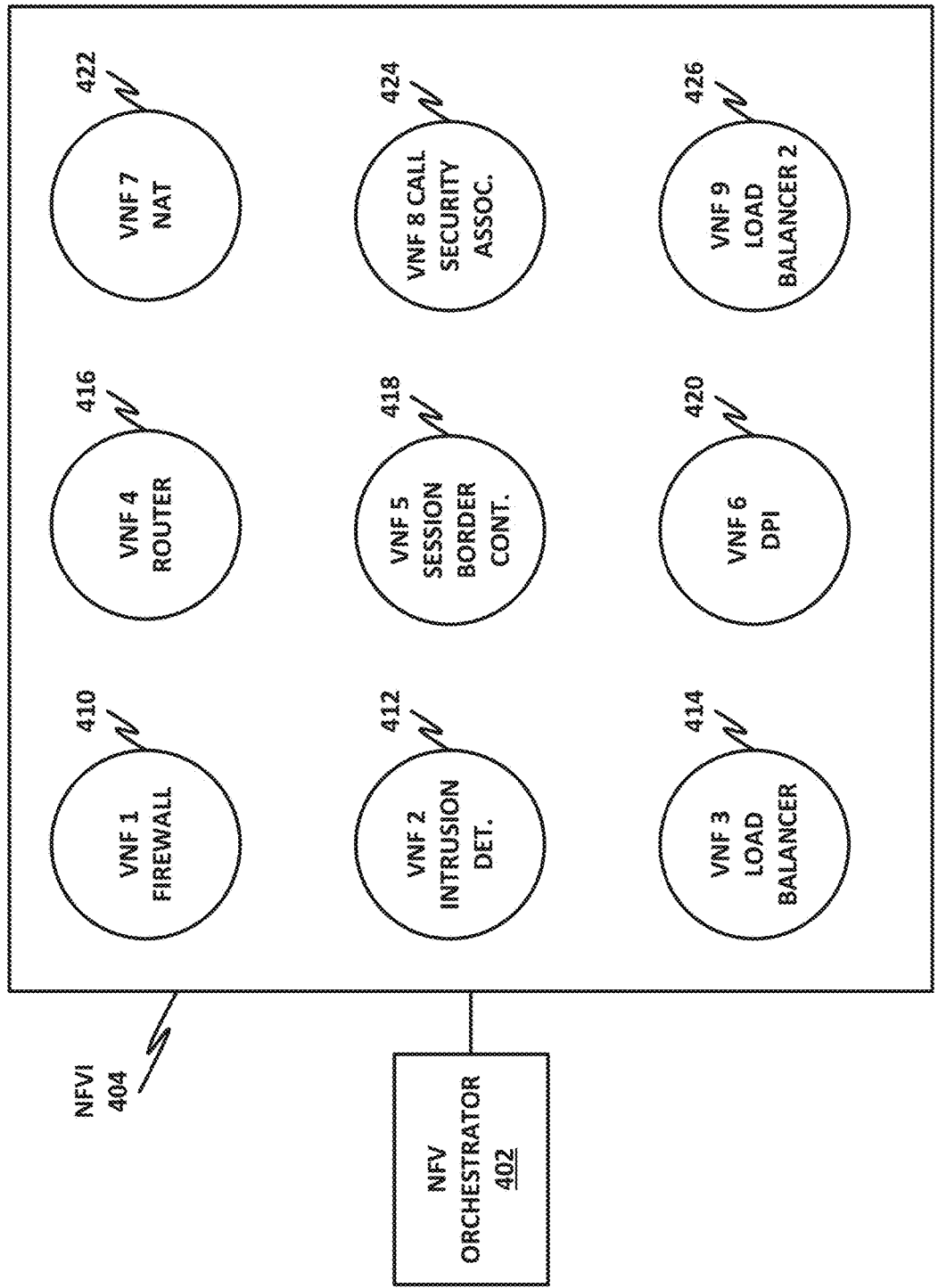
FIG. 4b is a block diagram of network function virtualization (NFV) according to one or more examples of the present specification.

Network Function Virtualization (NFV), illustrated in FIG. 4b, is a second nonlimiting flavor of network virtualization, often treated as an add-on or improvement to SDN, but sometimes treated as a separate entity. NFV was originally envisioned as a method for providing reduced Capital Expenditure (Capex) and Operating Expenses (Opex) for telecommunication services, which relied heavily on fast, single purpose service appliances. One important feature of NFV is replacing proprietary, special-purpose hardware appliances with virtual appliances running on Commercial Off-The-Shelf (COTS) hardware within a virtualized environment. In addition to Capex and Opex savings, NFV provides a more agile and adaptable network. As network loads change, Virtual Network Functions (VNFs) can be provisioned ("spun up") or removed ("spun down") to meet network demands. For example, in times of high load, more load balancer VNFs may be spun up to distribute traffic to more workload servers (which may themselves be virtual machines). In times when more suspicious traffic is experienced, additional firewalls or Deep Packet Inspection (DPI) appliances may be needed.

Because NFV started out as a telecommunications feature, many NFV instances are focused on telecommunications. However, NFV is not limited to telecommunication services. In a broad sense, NFV includes one or more VNFs running within a Network Function Virtualization Infrastructure (NFVI). Often, the VNFs are in-line service functions that are separate from workload servers or other nodes (in many cases, workload-type functions were long since virtualized). These VNFs can be chained together into a service chain, which may be defined by a virtual subnetwork, and which may include a serial string of network services that provide behind-the-scenes work, such as security, logging, billing, and similar. In one example, an incoming packet passes through a chain of services in a service chain, with one or more of the services being provided by a VNF, whereas historically each of those functions may have been provided by bespoke hardware in a physical service appliance. Because NFVs can be spun up and spun down to meet demand, the allocation of hardware and other resources can be made more efficient. Processing resources can be allocated to meet the greatest demand, whereas with physical service appliances, any unused capacity on an appliance is simply wasted, and increasing capacity to meet demand required plugging in a physical (expensive) bespoke service appliance.

The illustrations of FIGS. 4a and 4b may be considered more functional, while in comparison the illustration of FIG. 1 may be more of a high-level logical layout of the network. It should be understood, however, that SDN 400 (FIG. 4a), NFVI 404 (FIG. 4b), and enterprise network 100 may be the same network, or may be separate networks.

In FIG. 4a, SDN 400 may include an SDN controller 410, a plurality of network devices 430, and a plurality of host devices 440. Some or all of SDN controller 410, network devices 430, and host devices 440 may be embodied within workload cluster 142 of FIG. 1, or may otherwise form a part of enterprise network 170.

SDN 400 is controlled by an SDN controller 410. SDN controller 410 is communicatively coupled to a plurality of network devices 430. Specifically, ND1 430-1, ND2 430-2, and ND5 430-5 are directly communicatively coupled to SDN controller 410. Network devices and ND3 430-3 and ND4 430-4 are not directly coupled to SDN controller 410, but rather coupled via the intermediate devices, such as ND2 430-2, and ND5 430-5.

Some network devices 430 also communicatively couple directly to host devices 440. Specifically, network device ND1 directly couples to host A 440-1, which has IP address 10.0.0.10, and MAC address FA:16:3:01:61:8. Network device ND2 430-2 directly couples to host B 440-2, which has IP address 10.0.0.20, and MAC address FA:16:3:01:63:B3. Network device ND5 430-5 directly couples to host D 440-3, which has IP address 10.0.0.30, and MAC address FA:16:3:01:54:83.

Network devices 430 may be configured to perform a variety of network functions, such as, by way of nonlimiting example, load-balancing, firewall, Deep Packet Inspection (DPI), DNS, antivirus, or any other suitable network function. The particular arrangement of interconnections between network devices 430 and from network devices 430 to host devices 440 may be determined by the particular network configuration and needs. Thus, the specific configuration of FIG. 4a should be understood to be an illustrative example only.

Each network device 430 may have a plurality of ingress and or egress interfaces, such as physical Ethernet or fabric ports. In an example, each interface may have a label or new name, such as P1, P2, P3, P4, P5, and so on. Thus, certain aspects of the network layout can be determined by inspecting which devices are connected on which interface. For example, network device ND1 430-1 has an ingress interface for receiving instructions and communicating with SDN controller 410. ND1 430-1 also has an interface P1 communicatively coupled to host A 440-1. ND1 430-1 has interface P2 that is communicatively coupled to ND2 430-2. In the case of ND2 430-2, it also couples to ND1 430-1 on its own interface P2, and couples to host B 440-2 via interface P1. ND2 430-2 communicatively couples to intermediate devices ND3 430-3 and ND4 430-4 via interfaces P3 and P4 respectively. Additional interface definitions are visible throughout the figure.

A flow table may be defined for traffic as it flows from one interface to another. This flow table is used so that a network device, such as ND2 430-2 can determine, after receiving a packet, where to send it next.

For example, the following flow tables may be defined for ND1 430-1-ND4 430-4.

TABLE 1

ND1 Flow Rule

| Ingress I/F | Source MAC | Destination Mac | Source IP | Dest. IP | Action |
|---|---|---|---|---|---|
| P1 | ANY | fa:16:3e:01:54:a3 | ANY | 10.0.0.30 | P2 |

TABLE 2

ND2 Flow Rule

| Ingress I/F | Source MAC | Destination Mac | Source IP | Dest. IP | Action |
|---|---|---|---|---|---|
| P2 | ANY | fa:16:3e:01:54:a3 | ANY | 10.0.0.30 | P4 |

TABLE 3

ND3 Flow Rule

| Ingress I/F | Source MAC | Destination Mac | Source IP | Dest. IP | Action |
|---|---|---|---|---|---|
| P1 | ANY | fa:16:3e:01:54:a3 | ANY | 10.0.0.30 | P3 |

TABLE 4

ND4 Flow Rule

| Ingress I/F | Source MAC | Destination Mac | Source IP | Dest. IP | Action |
|---|---|---|---|---|---|
| P3 | ANY | fa:16:3e:01:54:a3 | ANY | 10.0.0.30 | P1 |

FIG. 4b is a block diagram of a Network Function Virtualization (NFV) architecture according to one or more examples of the present specification. Like SDN, NFV is a subset of network virtualization. Thus, the network as illustrated in FIG. 4b may be defined instead of or in addition to the network of FIG. 4a. In other words, certain portions of the network may rely on SDN, while other portions (or the same portions) may rely on NFV.

In the example of FIG. 4b, an NFV orchestrator 402 manages a number of the VNFs running on an NFVI 404. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus the need for NFV orchestrator 402.

Note that VNF orchestrator 402 itself is usually virtualized (rather than a special-purpose hardware appliance). NFV orchestrator 402 may be integrated within an existing SDN system, wherein an Operations Support System (OSS) manages the SDN. This may interact with cloud resource management systems (e.g., OpenStack) to provide NVF orchestration. There are many commercially-available, off-the-shelf, proprietary, and open source solutions for NFV orchestration and management (sometimes referred to as NFV MANO). In addition to NFV orchestrator 402, NFV MANO may also include functions such as Virtualized Infrastructure Management (VIM) and a VNF manager.

An NFVI 404 may include the hardware, software, and other infrastructure to enable VNFs to run. This may include, for example, a rack or several racks of blade or slot servers (including, e.g., processors, memory, and storage), one or more data centers, other hardware resources distributed across one or more geographic locations, hardware switches, or network interfaces. An NFVI 404 may also include the software architecture that enables hypervisors to run and be managed by NFV orchestrator 402. NFVI 402 may include NFVI Points of Presence (NFVI-Pops), where VNFs are deployed by the operator.

Running on NFVI 404 are a number of virtual machines, each of which in this example is a VNF providing a virtual service appliance. These include, as nonlimiting and illustrative examples, VNF 1 410, which is a firewall, VNF 2 412, which is an intrusion detection system, VNF 3 414, which is a load balancer, VNF 4 416, which is a router, VNF 5 418, which is a session border controller, VNF 6 420, which is a Deep Packet Inspection (DPI) service, VNF 7 422, which is a Network Address Translation (NAT) module, VNF 8 424, which provides call security association, and VNF 9 426, which is a second load balancer spun up to meet increased demand.

Firewall 410 is a security appliance that monitors and controls the traffic (both incoming and outgoing), based on matching traffic to a list of "firewall rules." Firewall 410 may be a barrier between a relatively trusted (e.g., internal) network, and a relatively untrusted network (e.g., the internet). Once traffic has passed inspection by firewall 410, it may be forwarded to other parts of the network.

Intrusion detection 412 monitors the network for malicious activity or policy violations. Incidents may be reported to security administrator 150, or collected and analyzed by a Security Information and Event Management (SIEM) system. In some cases, intrusion detection 412 may also include antivirus or antimalware scanners.

Load balancers 414 and 426 may farm traffic out to a group of substantially identical workload servers to distribute the work in a fair fashion. In one example, a load balancer provisions a number of traffic "buckets," and assigns each bucket to a workload server. Incoming traffic is assigned to a bucket based on a factor, such as a hash of the source IP address. Because the hashes are assumed to be fairly evenly distributed, each workload server receives a reasonable amount of traffic.

Router 416 forwards packets between networks or subnetworks. For example, router 416 may include one or more ingress interfaces, and a plurality of egress interfaces, with each egress interface being associated with a resource, subnetwork, virtual private network, or other division. When traffic comes in on an ingress interface, router 416 determines what destination it should go to, and routes the packet to the appropriate egress interface.

Session border controller 418 controls voice over IP (VoIP) signaling, as well as the media streams to set up, conduct, and terminate calls. In this context, "session" refers to a communication event (e.g., a "call"). "Border" refers to a demarcation between two different parts of a network (similar to a firewall).

DPI appliance 420 provides deep packet inspection, including examining not only the header, but also the content of a packet to search for Potentially Unwanted Content (PUC), such as protocol non-compliance, malware, viruses, spam, or intrusions.

NAT module 422 provides network address translation services to remap one IP address space into another (e.g., mapping addresses within a private subnetwork onto the larger internet).

Call security association 424 creates a security association for a call or other session (see session border controller 418 above). Maintaining this security association may be critical, as the call may be dropped if the security association is broken.

The illustration of FIG. 4 shows that a number of VNFs have been provisioned and exist within NFVI 404. This figure does not necessarily illustrate any relationship between the VNFs and the larger network.

Figure 5:
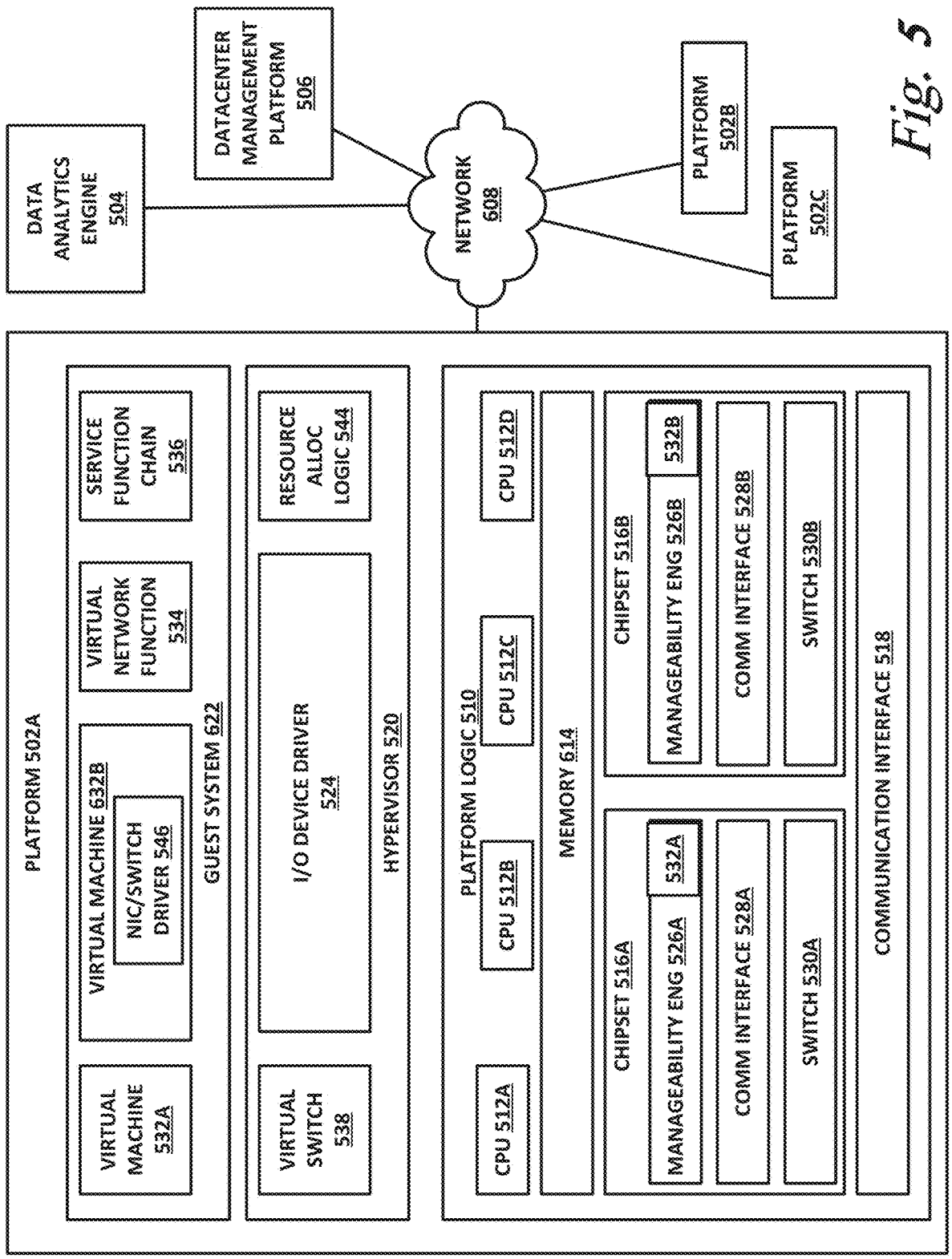
FIG. 5 is a block diagram of a platform architecture according to one or more examples of the present specification.

FIG. 5 illustrates a block diagram of components of a computing platform 500 according to one or more examples of the present specification. In the embodiment depicted, computer platform 500 includes a plurality of platforms 502 and system management platform 506 coupled together through network 508. In other embodiments, a computer system may include any suitable number of (i.e., one or more) platforms. In some embodiments (e.g., when a computer system only includes a single platform), all or a portion of the system management platform 506 may be included on a platform 502. A platform 502 may include platform logic 510 with one or more central processing units (CPUs) 512, memories 514 (which may include any number of different modules), chipsets 516, communication interfaces 518, and any other suitable hardware and/or software to execute a hypervisor 520 or other operating system capable of executing workloads associated with applications running on platform 502. In some embodiments, a platform 502 may function as a host platform for one or more guest systems 522 that invoke these applications. Platform 500 may represent any suitable computing environment, such as a high performance computing environment, a datacenter, a communications service provider infrastructure (e.g., one or more portions of an Evolved Packet Core), an in-memory computing environment, a computing system of a vehicle (e.g., an automobile or airplane), an Internet of Things environment, an industrial control system, other computing environment, or combination thereof.

In various embodiments of the present disclosure, accumulated stress and/or rates of stress accumulated to a plurality of hardware resources (e.g., cores and uncores) are monitored and entities (e.g., system management platform 506, hypervisor 520, or other operating system) of computer platform 500 may assign hardware resources of platform logic 510 to perform workloads in accordance with the stress information. For example, system management platform 506, hypervisor 520 or other operating system, or CPUs 512 may determine one or more cores to schedule a workload onto based on the stress information. In some embodiments, self-diagnostic capabilities may be combined with the stress monitoring to more accurately determine the health of the hardware resources. Such embodiments may allow optimization in deployments including Network Function Virtualization (NFV), Software Defined Networking (SDN), or Mission Critical applications. For example, the stress information may be consulted during the initial placement of VNFs (Virtual Network Functions) or for migration from one platform to another in order to improve reliability and capacity utilization.

Each platform 502 may include platform logic 510. Platform logic 510 comprises, among other logic enabling the functionality of platform 502, one or more CPUs 512, memory 514, one or more chipsets 516, and communication interface 518. Although three platforms are illustrated, computer platform 500 may include any suitable number of platforms. In various embodiments, a platform 502 may reside on a circuit board that is installed in a chassis, rack, or other suitable structure that comprises multiple platforms coupled together through network 508 (which may comprise, e.g., a rack or backplane switch).

CPUs 512 may each comprise any suitable number of processor cores and supporting logic (e.g., uncores). The cores may be coupled to each other, to memory 514, to at least one chipset 516, and/or to communication interface 518, through one or more controllers residing on CPU 612 and/or chipset 516. In particular embodiments, a CPU 612 is embodied within a socket that is permanently or removably coupled to platform 502. CPU 612 is described in further detail below in connection with FIG. 2. Although four CPUs are shown, a platform 502 may include any suitable number of CPUs.

Memory 514 may comprise any form of volatile or nonvolatile memory including, without limitation, magnetic media (e.g., one or more tape drives), optical media, Random Access Memory (RAM), Read-Only Memory (ROM), flash memory, removable media, or any other suitable local or remote memory component or components. Memory 514 may be used for short, medium, and/or long term storage by platform 502. Memory 514 may store any suitable data or information utilized by platform logic 510, including software embedded in a computer readable medium, and/or encoded logic incorporated in hardware or otherwise stored (e.g., firmware). Memory 514 may store data that is used by cores of CPUs 512. In some embodiments, memory 514 may also comprise storage for instructions that may be executed by the cores of CPUs 512 or other processing elements (e.g., logic resident on chipsets 516) to provide functionality associated with the manageability engine 526 or other components of platform logic 510. Additionally or alternatively, chipsets 516 may each comprise memory that may have any of the characteristics described herein with respect to memory 514. Memory 514 may also store the results and/or intermediate results of the various calculations and determinations performed by CPUs 512 or processing elements on chipsets 516. In various embodiments, memory 514 may comprise one or more modules of system memory coupled to the CPUs through memory controllers (which may be external to or integrated with CPUs 512). In various embodiments, one or more particular modules of memory 514 may be dedicated to a particular CPU 612 or other processing device or may be shared across multiple CPUs 512 or other processing devices.

In various embodiments, memory 514 may store stress information (such as accumulated stress values associated with hardware resources of platform logic 510 in non-volatile memory, such that when power is lost, the accumulated stress values are maintained). In particular embodiments, a hardware resource may comprise nonvolatile memory (e.g., on the same die as the particular hardware resource) for storing the hardware resource's accumulated stress value.

A platform 502 may also include one or more chipsets 516 comprising any suitable logic to support the operation of the CPUs 512. In various embodiments, chipset 516 may reside on the same die or package as a CPU 612 or on one or more different dies or packages. Each chipset may support any suitable number of CPUs 512. A chipset 516 may also include one or more controllers to couple other components of platform logic 510 (e.g., communication interface 518 or memory 514) to one or more CPUs. Additionally or alternatively, the CPUs 512 may include integrated controllers. For example, communication interface 518 could be coupled directly to CPUs 512 via integrated I/O controllers resident on each CPU.

In the embodiment depicted, each chipset 516 also includes a manageability engine 526. Manageability engine 526 may include any suitable logic to support the operation of chipset 516. In a particular embodiment, manageability engine 526 (which may also be referred to as an innovation engine) is capable of collecting real-time telemetry data from the chipset 516, the CPU(s) 512 and/or memory 514 managed by the chipset 516, other components of platform logic 510, and/or various connections between components of platform logic 510. In various embodiments, the telemetry data collected includes the stress information described herein.

In various embodiments, the manageability engine 526 operates as an out-of-band asynchronous compute agent which is capable of interfacing with the various elements of platform logic 510 to collect telemetry data with no or minimal disruption to running processes on CPUs 512. For example, manageability engine 526 may comprise a dedicated processing element (e.g., a processor, controller, or other logic) on chipset 516 which provides the functionality of manageability engine 526 (e.g., by executing software instructions), thus conserving processing cycles of CPUs 512 for operations associated with the workloads performed by the platform logic 510. Moreover the dedicated logic for the manageability engine 526 may operate asynchronously with respect to the CPUs 512 and may gather at least some of the telemetry data without increasing the load on the CPUs.

The manageability engine 526 may process telemetry data it collects (specific examples of the processing of stress information will be provided herein). In various embodiments, manageability engine 526 reports the data it collects and/or the results of its processing to other elements in the computer system, such as one or more hypervisors 520 or other operating systems and/or system management software (which may run on any suitable logic such as system management platform 506). In some embodiments, the telemetry data is updated and reported periodically to one or more of these entities. In particular embodiments, a critical event such as a core that has accumulated an excessive amount of stress may be reported prior to the normal interval for reporting telemetry data (e.g., a notification may be sent immediately upon detection).

In various embodiments, a manageability engine 526 may include programmable code configurable to set which CPU (s) 512 a particular chipset 516 will manage and/or which telemetry data will be collected.

Chipsets 516 also each include a communication interface 528. Communication interface 528 may be used for the communication of signaling and/or data between chipset 516 and one or more I/O devices, one or more networks 508, and/or one or more devices coupled to network 508 (e.g., system management platform 506). For example, communication interface 528 may be used to send and receive network traffic such as data packets. In a particular embodiment, communication interface 528 comprises one or more physical Network Interface Controllers (NICs), also known as network interface cards or network adapters. A NIC may include electronic circuitry to communicate using any suitable physical layer and data link layer standard such as Ethernet (e.g., as defined by a IEEE 802.3 standard), Fibre Channel, InfiniBand, Wi-Fi, or other suitable standard. A NIC may include one or more physical ports that may couple to a cable (e.g., an Ethernet cable). A NIC may enable communication between any suitable element of chipset 516 (e.g., manageability engine 526 or switch 530) and another device coupled to network 508. In some embodiments, network 508 may comprise a switch with bridging and/or routing functions that is external to the platform 502 and operable to couple various NICs distributed throughout the computer platform 500 (e.g., on different platforms) to each other. In various embodiments a NIC may be integrated with the chipset (i.e., may be on the same integrated circuit or circuit board as the rest of the chipset logic) or may be on a different integrated circuit or circuit board that is electromechanically coupled to the chipset.

In particular embodiments, communication interface 528 may allow communication of data (e.g., between the manageability engine 526 and the system management platform 506) associated with management and monitoring functions performed by manageability engine 526. In various embodiments, manageability engine 526 may utilize elements (e.g., one or more NICs) of communication interface 528 to report the telemetry data (e.g., to system management platform 506) in order to reserve usage of NICs of communication interface 518 for operations associated with workloads performed by platform logic 510. In some embodiments, communication interface 528 may also allow I/O devices integrated with or external to the platform (e.g., disk drives, other NICs, etc.) to communicate with the CPU cores.

Switch 530 may couple to various ports (e.g., provided by NICs) of communication interface 528 and may switch data between these ports and various components of chipset 516 (e.g., one or more Peripheral Component Interconnect Express (PCIe) lanes coupled to CPUs 512). Switch 530 may be a physical or virtual (i.e., software) switch.

Platform logic 510 may include an additional communication interface 518. Similar to communication interface 528, communication interface 518 may be used for the communication of signaling and/or data between platform logic 510 and one or more networks 508 and one or more devices coupled to the network 508. For example, communication interface 518 may be used to send and receive network traffic such as data packets. In a particular embodiment, communication interface 518 comprises one or more physical NICs. These NICs may enable communication between any suitable element of platform logic 510 (e.g., CPUs 512 or memory 514) and another device coupled to network 508 (e.g., elements of other platforms or remote computing devices coupled to network 508 through one or more networks). In particular embodiments, communication interface 518 may allow devices external to the platform (e.g., disk drives, other NICs, etc.) to communicate with the CPU cores. In various embodiments, NICs of communication interface 518 may be coupled to the CPUs through I/O controllers (which may be external to or integrated with CPUs 512).

Platform logic 510 may receive and perform any suitable types of workloads. A workload may include any request to utilize one or more resources of platform logic 510, such as one or more cores or associated logic. For example, a workload may comprise a request to instantiate a software component, such as an I/O device driver 524 or guest system 522; a request to process a network packet received from a virtual machine 532 or device external to platform 502 (such as a network node coupled to network 508); a request to execute a process or thread associated with a guest system 522, an application running on platform 502, a hypervisor 520 or other operating system running on platform 502; or other suitable processing request.

In various embodiments, platform 502 may execute any number of guest systems 522. A guest system may comprise a single virtual machine (e.g., virtual machine 532*a* or 532*b*) or multiple virtual machines operating together (e.g., a virtual network function (VNF) 534 or a service function chain (SFC) 536). As depicted, various embodiments may include a variety of types of guest systems 522 present on the same platform 502.

A virtual machine 532 may emulate a computer system with its own dedicated hardware. A virtual machine 532 may run a guest operating system on top of the hypervisor 520. The components of platform logic 510 (e.g., CPUs 512, memory 514, chipset 516, and communication interface 518) may be virtualized such that it appears to the guest operating system that the virtual machine 532 has its own dedicated components.

A virtual machine 532 may include a virtualized NIC (vNIC), which is used by the virtual machine as its network interface. A vNIC may be assigned a Media Access Control (MAC) address or other identifier, thus allowing multiple virtual machines 532 to be individually addressable in a network.

In some embodiments, a virtual machine 532b may be paravirtualized. For example, the virtual machine 532b may include augmented drivers (e.g., drivers that provide higher performance or have higher bandwidth interfaces to underlying resources or capabilities provided by the hypervisor 520). For example, an augmented driver may have a faster interface to underlying virtual switch 538 for higher network performance as compared to default drivers.

VNF 534 may comprise a software implementation of a functional building block with defined interfaces and behavior that can be deployed in a virtualized infrastructure. In particular embodiments, a VNF 534 may include one or more virtual machines 532 that collectively provide specific functionalities (e.g., Wide Area Network (WAN) optimization, Virtual Private Network (VPN) termination, firewall operations, load-balancing operations, security functions, etc.). A VNF 534 running on platform logic 510 may provide the same functionality as traditional network components implemented through dedicated hardware. For example, a VNF 534 may include components to perform any suitable NFV workloads, such as virtualized Evolved Packet Core (vEPC) components, Mobility Management Entities (MME), 3rd Generation Partnership Project (3GPP) control and data plane components, etc.

SFC 536 is a group of VNFs 534 organized as a chain to perform a series of operations, such as network packet processing operations. Service function chaining may provide the ability to define an ordered list of network services (e.g., firewalls, load balancers) that are stitched together in the network to create a service chain.

A hypervisor 520 (also known as a virtual machine monitor) may comprise logic to create and run guest systems 522. The hypervisor 520 may present guest operating systems run by virtual machines with a virtual operating platform (i.e., it appears to the virtual machines that they are running on separate physical nodes when they are actually consolidated onto a single hardware platform) and manage the execution of the guest operating systems by platform logic 510. Services of hypervisor 520 may be provided by virtualizing in software or through hardware assisted resources that require minimal software intervention, or both. Multiple instances of a variety of guest operating systems may be managed by the hypervisor 520. Each platform 502 may have a separate instantiation of a hypervisor 520.

Hypervisor 520 may be a native or bare-metal hypervisor that runs directly on platform logic 510 to control the platform logic and manage the guest operating systems. Alternatively, hypervisor 520 may be a hosted hypervisor that runs on a host operating system and abstracts the guest operating systems from the host operating system. Various embodiments may include one or more non-virtualized platforms 502, in which case any suitable characteristics or functions of hypervisor 520 described herein may apply to an operating system of the non-virtualized platform.

Hypervisor 520 may include a virtual switch 538 that may provide virtual switching and/or routing functions to virtual machines of guest systems 522. The virtual switch 538 may comprise a logical switching fabric that couples the vNICs of the virtual machines 532 to each other, thus creating a virtual network through which virtual machines may communicate with each other. Virtual switch 538 may also be coupled to one or more networks (e.g., network 508) via physical NICs of communication interface 518 so as to allow communication between virtual machines 532 and one or more network nodes external to platform 502 (e.g., a virtual machine running on a different platform 502 or a node that is coupled to platform 502 through the Internet or other network). Virtual switch 538 may comprise a software element that is executed using components of platform logic 510. In various embodiments, hypervisor 520 may be in communication with any suitable entity (e.g., a SDN controller) which may cause hypervisor 520 to reconfigure the parameters of virtual switch 538 in response to changing conditions in platform 502 (e.g., the addition or deletion of virtual machines 532 or identification of optimizations that may be made to enhance performance of the platform).

Hypervisor 520 may also include resource allocation logic 544 which may include logic for determining allocation of platform resources based on the telemetry data (which may include stress information). Resource allocation logic 544 may also include logic for communicating with various components of platform logic 510 entities of platform 502 to implement such optimization, such as components of platform logic 502. For example, resource allocation logic 544 may direct which hardware resources of platform logic 510 will be used to perform workloads based on stress information.

Any suitable logic may make one or more of these optimization decisions. For example, system management platform 506; resource allocation logic 544 of hypervisor 520 or other operating system; or other logic of platform 502 or computer platform 500 may be capable of making such decisions (either alone or in combination with other elements of the platform 502). In a particular embodiment, system management platform 506 may communicate (using in-band or out-of-band communication) with the hypervisor 520 to specify the optimizations that should be used in order to meet policies stored at the system management platform.

In various embodiments, the system management platform 506 may receive telemetry data from and manage workload placement across multiple platforms 502. The system management platform 506 may communicate with hypervisors 520 (e.g., in an out-of-band manner) or other operating systems of the various platforms 502 to implement workload placements directed by the system management platform.

The elements of platform logic 510 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g., cache coherent) bus, a layered protocol architecture, a differential bus, or a Gunning Transceiver Logic (GTL) bus.

Elements of the computer platform 500 may be coupled together in any suitable manner such as through one or more networks 508. A network 508 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices. A network offers communicative interfaces between sources and/or hosts, and may comprise any Local Area Network (LAN), Wireless Local Area Network (WLAN), Metropolitan Area Network (MAN), Intranet, Extranet, Internet, Wide Area Network (WAN), Virtual Private Network (VPN), cellular network, or any other appropriate architecture or system that facilitates communications in a network environment. A network can comprise any number of hardware or software elements coupled to (and in communication with) each other through a communications medium. In various embodiments, guest systems 522 may communicate with nodes that are external to the computer platform 500 through network 508.

Figure 6:
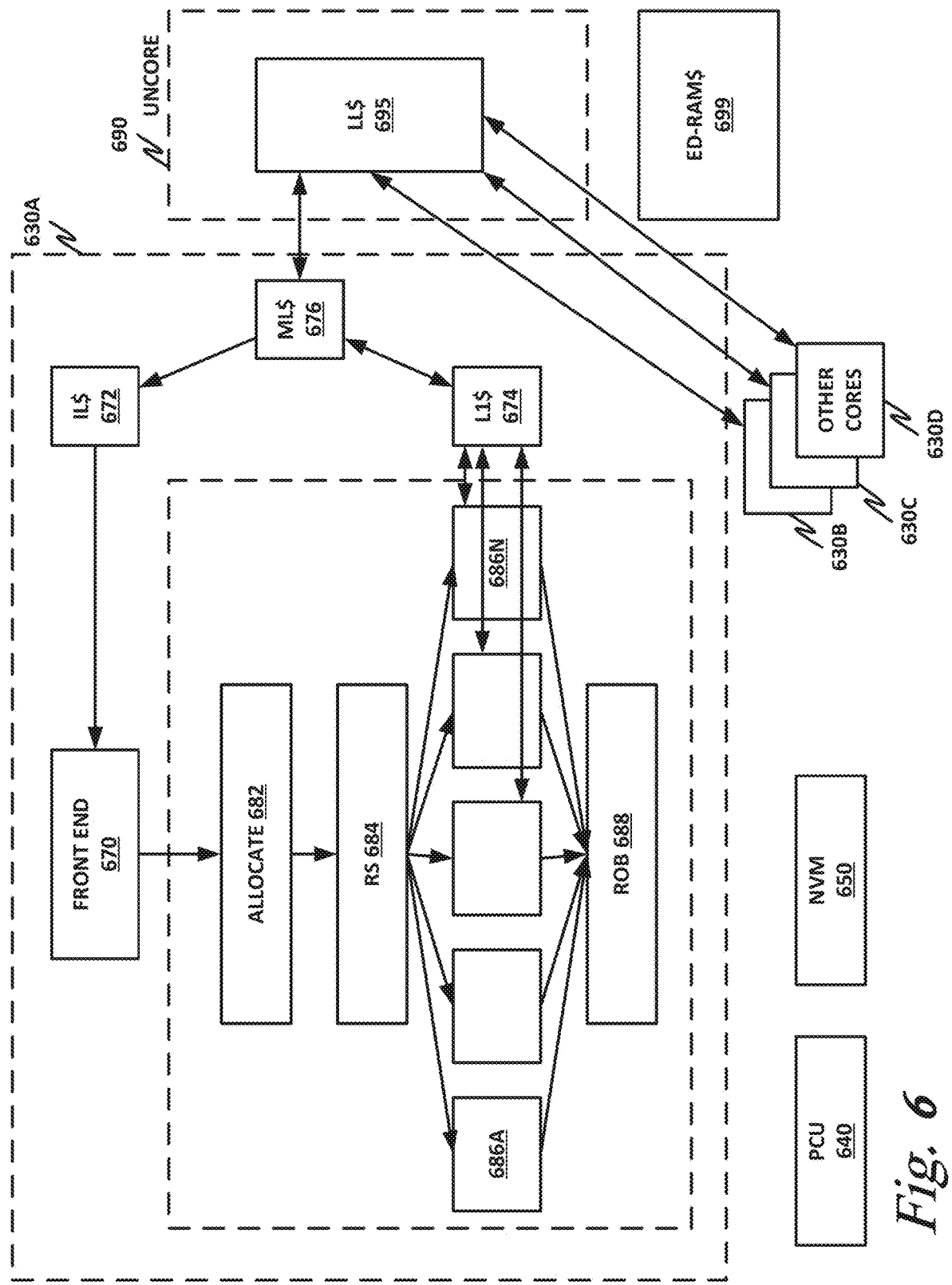
FIG. 6 is a block diagram of a processor according to one or more examples of the present specification.

FIG. 6 illustrates a block diagram of a central processing unit (CPU) 612 in accordance with certain embodiments. Although CPU 612 depicts a particular configuration, the cores and other components of CPU 612 may be arranged in any suitable manner. CPU 612 may comprise any processor or processing device, such as a microprocessor, an embedded processor, a Digital Signal Processor (DSP), a network processor, an application processor, a co-processor, a System On a Chip (SOC), or other device to execute code. CPU 612, in the depicted embodiment, includes four processing elements (cores 630 in the depicted embodiment), which may include asymmetric processing elements or symmetric processing elements. However, CPU 612 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical CPU 612 may include any suitable number of cores. In various embodiments, cores may include one or more out-of-order processor cores or one or more in-order processor cores. However, cores may be individually selected from any type of core, such as a native core, a software managed core, a core adapted to execute a native Instruction Set Architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

In the embodiment depicted, core 630A includes an out-of-order processor that has a front end unit 670 used to fetch incoming instructions, perform various processing (e.g., caching, decoding, branch predicting, etc.) and passing instructions/operations along to an Out-Of-Order (OOO) engine 680. OOO engine 680 performs further processing on decoded instructions.

A front end 670 may include a decode module coupled to fetch logic to decode fetched elements. Fetch logic, in one embodiment, includes individual sequencers associated with thread slots of cores 630. Usually a core 630 is associated with a first ISA, which defines/specifies instructions executable on core 630. Often machine code instructions that are part of the first ISA include a portion of the instruction (referred to as an opcode), which references/specifies an instruction or operation to be performed. The decode module may include circuitry that recognizes these instructions from their opcodes and passes the decoded instructions on in the pipeline for processing as defined by the first ISA. For example, decoders may, in one embodiment, include logic designed or adapted to recognize specific instructions, such as transactional instructions. As a result of the recognition by the decoders, the architecture of core 630 takes specific, predefined actions to perform tasks associated with the appropriate instruction. It is important to note that any of the tasks, blocks, operations, and methods described herein may be performed in response to a single or multiple instructions; some of which may be new or old instructions. Decoders of cores 630, in one embodiment, recognize the same ISA (or a subset thereof). Alternatively, in a heterogeneous core environment, a decoder of one or more cores (e.g., core 630B) may recognize a second ISA (either a subset of the first ISA or a distinct ISA).

In the embodiment depicted, out-of-order engine 680 includes an allocate unit 682 to receive decoded instructions, which may be in the form of one or more micro-instructions or µops, from front end unit 670, and allocate them to appropriate resources such as registers and so forth. Next, the instructions are provided to a reservation station 684, which reserves resources and schedules them for execution on one of a plurality of execution units 686A-686N. Various types of execution units may be present, including, for example, Arithmetic Logic Units (ALUs), load and store units, Vector Processing Units (VPUs), floating point execution units, among others. Results from these different execution units are provided to a Reorder Buffer (ROB) 688, which take unordered results and return them to correct program order.

In the embodiment depicted, both front end unit 670 and out-of-order engine 680 are coupled to different levels of a memory hierarchy. Specifically shown is an instruction level cache 672, that in turn couples to a mid-level cache 676, that in turn couples to a last level cache 695. In one embodiment, last level cache 695 is implemented in an on-chip (sometimes referred to as uncore) unit 690. Uncore 690 may communicate with system memory 699, which, in the illustrated embodiment, is implemented via embedded DRAM (eDRAM). The various execution units 686 within out-of-order engine 680 are in communication with a first level cache 674 that also is in communication with mid-level cache 676. Additional cores 630B-630D may couple to last level cache 695 as well.

In various embodiments, uncore 690 (sometimes referred to as a system agent) may include any suitable logic that is not a part of core 630. For example, uncore 690 may include one or more of a last level cache, a cache controller, an on-die memory controller coupled to a system memory, a processor interconnect controller (e.g., an Ultra Path Interconnect or similar controller), an on-die I/O controller, or other suitable on-die logic.

In particular embodiments, uncore 690 may be in a voltage domain and/or a frequency domain that is separate from voltage domains and/or frequency domains of the cores. That is, uncore 690 may be powered by a supply voltage that is different from the supply voltages used to power the cores and/or may operate at a frequency that is different from the operating frequencies of the cores.

CPU 612 may also include a Power Control Unit (PCU) 640. In various embodiments, PCU 640 may control the supply voltages and the operating frequencies applied to each of the cores (on a per-core basis) and to the uncore. PCU 640 may also instruct a core or uncore to enter an idle state (where no voltage and clock are supplied) when not performing a workload.

In various embodiments, PCU 640 may detect one or more stress characteristics of a hardware resource, such as the cores and the uncore. A stress characteristic may comprise an indication of an amount of stress that is being placed on the hardware resource. As examples, a stress characteristic may be a voltage or frequency applied to the hardware resource; a power level, current level, or voltage level sensed at the hardware resource; a temperature sensed at the hardware resource; or other suitable measurement. In various embodiments, multiple measurements (e.g., at different locations) of a particular stress characteristic may be performed when sensing the stress characteristic at a particular instance of time. In various embodiments, PCU 640 may detect stress characteristics at any suitable interval.

In various embodiments, PCU 640 may comprise a microcontroller that executes embedded firmware to perform various operations associated with stress monitoring described herein. In one embodiment, PCU 640 performs some or all of the PCU functions described herein using hardware without executing software instructions. For example, PCU 640 may include fixed and/or programmable logic to perform the functions of the PCU.

In various embodiments, PCU 640 is a component that is discrete from the cores 630. In particular embodiments, PCU 640 runs at a clock frequency that is different from the clock frequencies used by cores 630. In some embodiments where PCU is a microcontroller, PCU 640 executes instructions according to an ISA that is different from an ISA used by cores 630.

In various embodiments, CPU 612 may also include a nonvolatile memory 650 to store stress information (such as stress characteristics, incremental stress values, accumulated stress values, stress accumulation rates, or other stress information) associated with cores 630 or uncore 690, such that when power is lost, the stress information is maintained.

Figure 7:
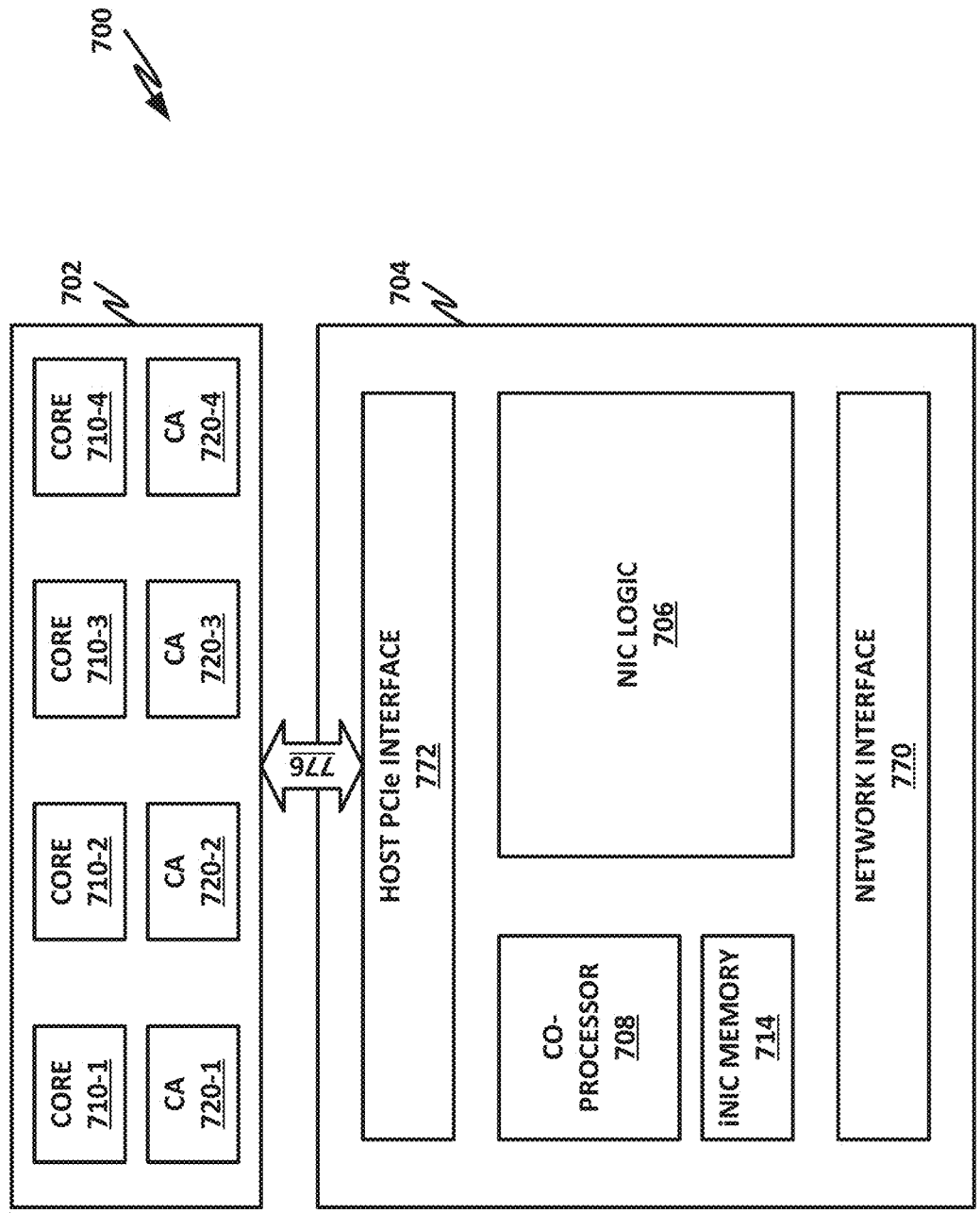
FIG. 7 is a block diagram of a computing architecture 700 according to one or more examples of the present specification.

FIG. 7 is a block diagram of a computing architecture 700 according to one or more examples of the present specification. In this example, there is provided a processing block 702, and a NIC 704. In this case, processing block 702 includes a plurality of cores 710, specifically cores 710-1, 710-2, 710-3, and 710-4. Each core 710 includes its own caching agent 720. Specifically, core 710-1 has caching agent 720-1. Core 710-2 has caching agent 720-2. Core 710-3 has caching agent 720-3. And core 710-4 has caching agent 710-4. Note that the inclusion of four cores and four caching agents in this example is intended to illustrate the operational principle. In practice, processing block 702 may include one core with one caching agent, or it may include many cores with many caching agents. In modern data centers, individual nodes may have as many as 64 to 128 cores.

In this example, processing block 702 interfaces with NIC 704 via PCIe interface 776. Thus, NIC 704 includes a host PCIe interface 772. Note that a PCIe interconnect is used herein as a nonlimiting example. In other embodiments, the interconnect may be any suitable interconnect or bus, including an on-die interconnect for an on-die NIC. Thus, host PCIe interface 772 may be referred to more generically as an interconnect interface, which may include an interface for communicatively coupling to any suitable interconnect.

Also included with NIC 704 is NIC logic 706, coprocessor 708, and NIC memory 714. Finally, NIC 704 includes a network interface 770, which is provided to communicatively couple NIC 704 to a network or fabric, such as an Intel® OmniPath fabric or an Ethernet network.

NIC logic 706 may include the ordinary logic for performing a network interface according to known functions. This includes translating traffic from interface 772 and directing the traffic to network interface 770, and vice versa.

Similarly, network interface 770 may, in some embodiments, be a simple network interface that provides ordinary interconnection to a network or fabric.

As described above, coprocessor 708 provides processing services that offload certain intensive and repetitive tasks from cores 710. These may include, by way of nonlimiting example, security, compression, encryption, or other repetitive tasks. Coprocessor 708 may be an FPGA, an ASIC, a programmable processor with associated software, a firmware device, or some other combination of programmable logic. Coprocessor 708 is provided with a NIC memory 714, which is a memory block that coprocessor 708 uses to perform its functions. NIC 804 includes a NIC memory 814, which includes both a shared memory 830 and a private memory 832.

Figure 8:
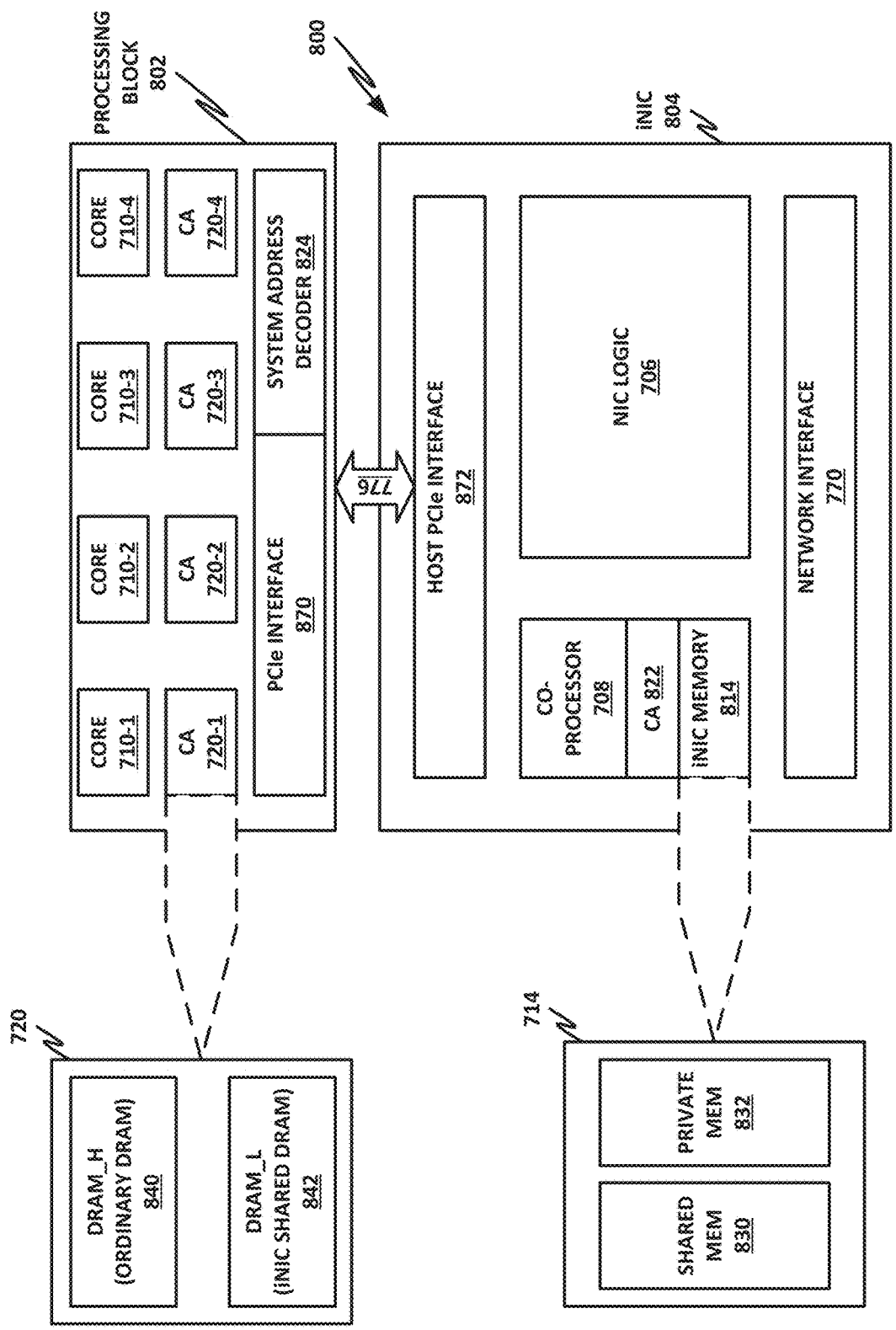
FIG. 8 is a block diagram of a computing architecture according to one or more examples of the present specification.

FIG. 8 is a block diagram of a computing architecture 800 according to one or more examples of the present specification. In this example, there is provided a processing block 802 and NIC 804. Processing block 802 includes cores 710-1, 710-2, 710-3, and 710-4. These operate respectively with caching agents 720-1, 720-2, 720-3, and 720-4. The identical numbers to FIG. 7 are used herein to illustrate that in some embodiments, no architectural changes may be required to cores 710-1 through 710-4, and caching agents 720-1 through 720-4. Rather, these may simply be programmed or configured to map certain address spaces to shared memory 830.

Similarly, NIC 804 includes NIC logic 706, network interface 770, and coprocessor 708. As before, the identical numbers to FIG. 7 are used herein to illustrate that in certain embodiments, these may be identical or substantially similar to the blocks provided in NIC 704 of FIG. 7.

In this example, NIC memory 814 is divided into shared memory 830, and private memory 832. NIC memory 814 is managed by caching agent 822.

In this case, caching agent 720-1 maps a high region of DRAM to ordinary DRAM address spaces 840. Caching agent 720-1 maps a lower region of DRAM to the shared memory 830.

By way of nonlimiting example, an application running on core 710-1 (e.g., a server engine 324 as in FIG. 3, providing services to a client engine 224 as in FIG. 2) may write to a memory location in shared memory 830, and generate a network or fabric request. The network or fabric request may be sent via PCIe channels to NIC 804. Host PCIe interface 872 may then sink the request to the NIC.

Next, coprocessor 708 may process the request. During this processing, a colliding memory operation may occur, such as NIC logic 706 trying to write to the same memory location. In some cases, caching agent 822 may generate snoops to maintain cache coherency, in order to resolve conflicts.

In one embodiment, once a transaction occurs, the transaction may be copied into shared memory 830. In the meantime, an application on NIC 804 may generate a request targeting NIC memory range that is cached in the host. In this case the caching agent in the NIC may generate a snoop to the compute element caching that particular memory range following the implemented coherency protocol (MESIF, MESI, etc.).

Finally, as necessary, the request is sent to the fabric via network interface 770.

Host PCIe interface 872 may be extended to understand that one or more dedicated virtual channels or lanes may be used to tunnel memory traffic to and from shared memory 830. Traffic coming from those lanes or channels may be forwarded to caching agent 822. Caching agent 822 processes requests coming from cores 710 and from within coprocessor 708. Note that this architecture may also work with multiple NICs 804, which may be connected via a plurality of PCIe buses 776. Requests from other NICs may be tunneled by the PCIe node agents to the corresponding NIC 804. Based on the request, caching agent 822 may generate read requests to the local memory, snoops to coprocessor 708, or snoops to CPU side caches.

PCIe interface 870 may also be extended to include System Address Decoder (SAD) 824, which maps a given address range to each NIC 804. Peer NICs' shared memory addresses may be accessed by NIC 804 by accessing the specific address ranges. The PCIe node agent may reroute requests when the address range is owned by a given NIC to that particular NIC. This architecture may work essentially transparently, as from the perspective of core 710, each access is simply a read to or write from a memory address.

In some embodiments, and particularly embodiments where a plurality of caching agents provide shared NIC memory, a SAD 824 may include a decoding rule that maps shared memory 830 into the shared DRAM address range 842. The caching agents 720 and 822 forward requests directed to these to shared memory 830 via PCIe bus 776. Advantageously, in some embodiments, no additional architectural changes are needed for processing block 802. The existing DRAM decoding rules in caching agent 720 may be used instead. Caching agent 720 forwards memory requests in the range of NIC-shared DRAM 842 in QPI or KTI form via PCIe bus 776.

In some examples, PCIe bus 776 may be augmented with one or more special lanes for tunneling memory requests between caching agents 720-1 and caching agent 822. These extra lanes may also be responsible for forwarding requests coming from coprocessor 708 caching agent 822, such as snoops, to the proper core 710 within processing block 802. Note that although one caching agent 822 is illustrated in this example, multiple caching agents could also be included to increase throughput. A hashing function on the address may be used to decide the caching agent 822 that is the home for a given address.

Figure 9:
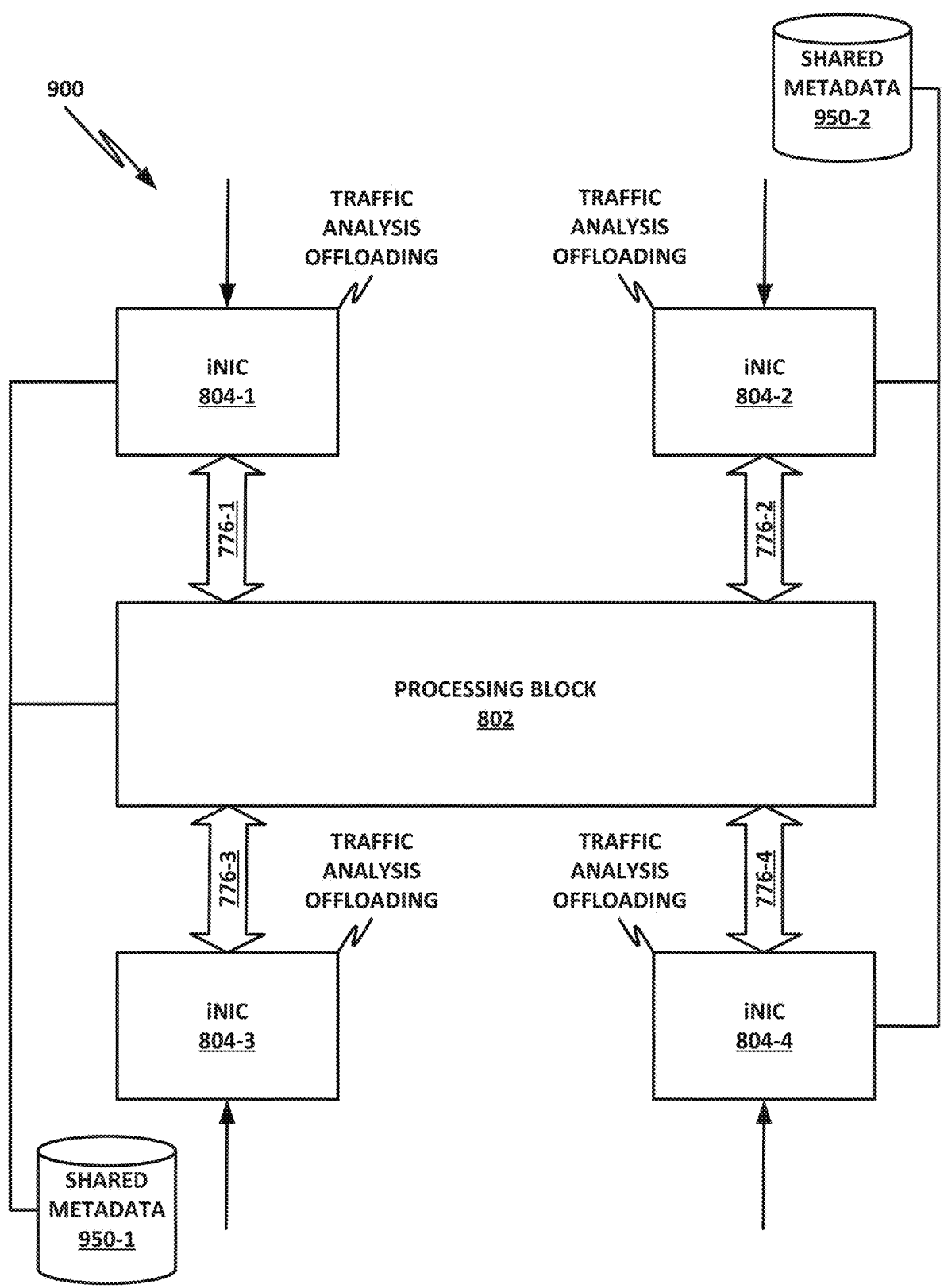
FIG. 9 is a block diagram of a data center according to one or more examples of the present specification.

FIG. 9 is a block diagram of a data center 900, illustrating one example application of the teachings of the present specification.

In the example of FIG. 9, there is provided a processing block 802, with processing block 802 communicatively coupled to a plurality of NICs 804, specifically NIC 804-1, NIC 804-2, NIC 804-3, and NIC 804-4. NIC 804-1 is communicatively coupled to processing block 802 via PCIe interface 776-1, NIC 804-2 is communicatively coupled to processing block 802 via PCIe interface 776-2, processing block 802 is communicatively coupled to NIC 804-3 via PCIe interface 776-3, and processing block 802 is communicatively coupled to NIC 804-4 via PCIe interface 776-4.

Each NIC 804 receives incoming traffic. For example, data center 900 may be providing search services, so that each NIC 804 receives a large volume of incoming search requests. Each NIC 804 also performs traffic analysis offloading. This frees the CPUs or cores of processing block 802 from having to perform the traffic analysis.

Both NIC 804-1 and NIC 804-3 include a store of shared metadata 950-1, while NIC 804-2 and NIC 804-4 have a store of shared metadata 950-2.

Data center 900 presents a network intensive application, such as a server for search services. In this case, in addition to serving Web requests that are CPU-intensive, data center 900 needs to contextualize searches and perform and maintain traffic analysis (for example, how many users of a given demographic access a given set of objects or services). Because NICs 804 are performing the traffic analysis, this function is offloaded from the CPUs, thus freeing up many CPU cycles.

However, even the task of coordinating with NICs 804 and switching back and forth between serving requests and transacting sends and receives with NICs 804 can consume a large number of CPU cycles and may drive up the cache miss rate. Thus, data center 901 employs the shared memory architecture of the present specification. With this shared memory architecture, CPUs within processing block 802 coordinate with NICs 804 directly via the shared DRAM area. This frees up CPU cycles that can be used to provide higher server throughput. This also reduces the latency of processing packets, because the CPUs and NICs 804 wait only on true dependencies, instead of waiting on completions and wake-ups. Thus, overall, this architecture streamlines the computing and communications, and improves TCO and performance.

Figure 10:
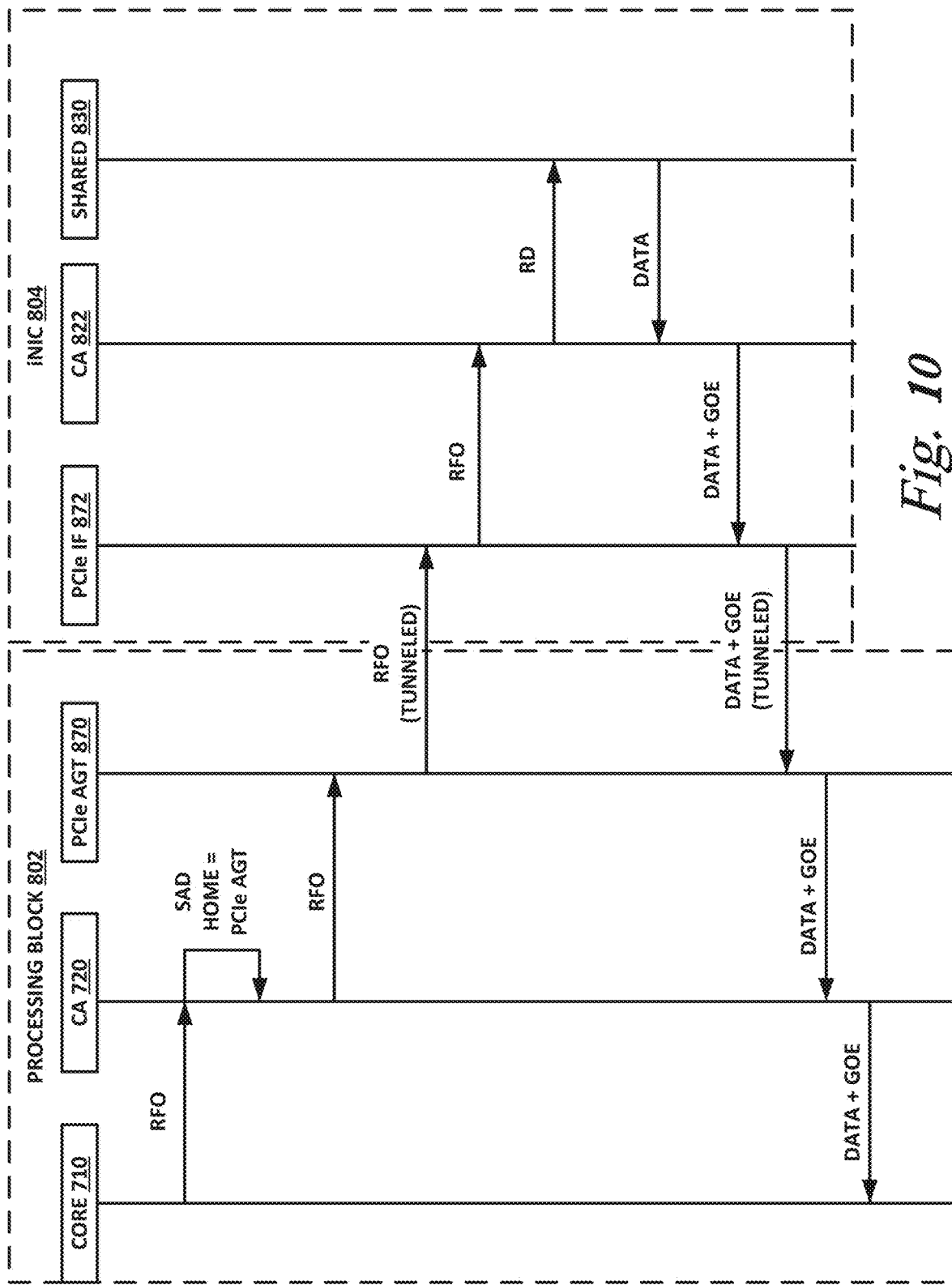
FIG. 10 illustrates a read flow according to one or more examples of the present specification.
Figure 11:
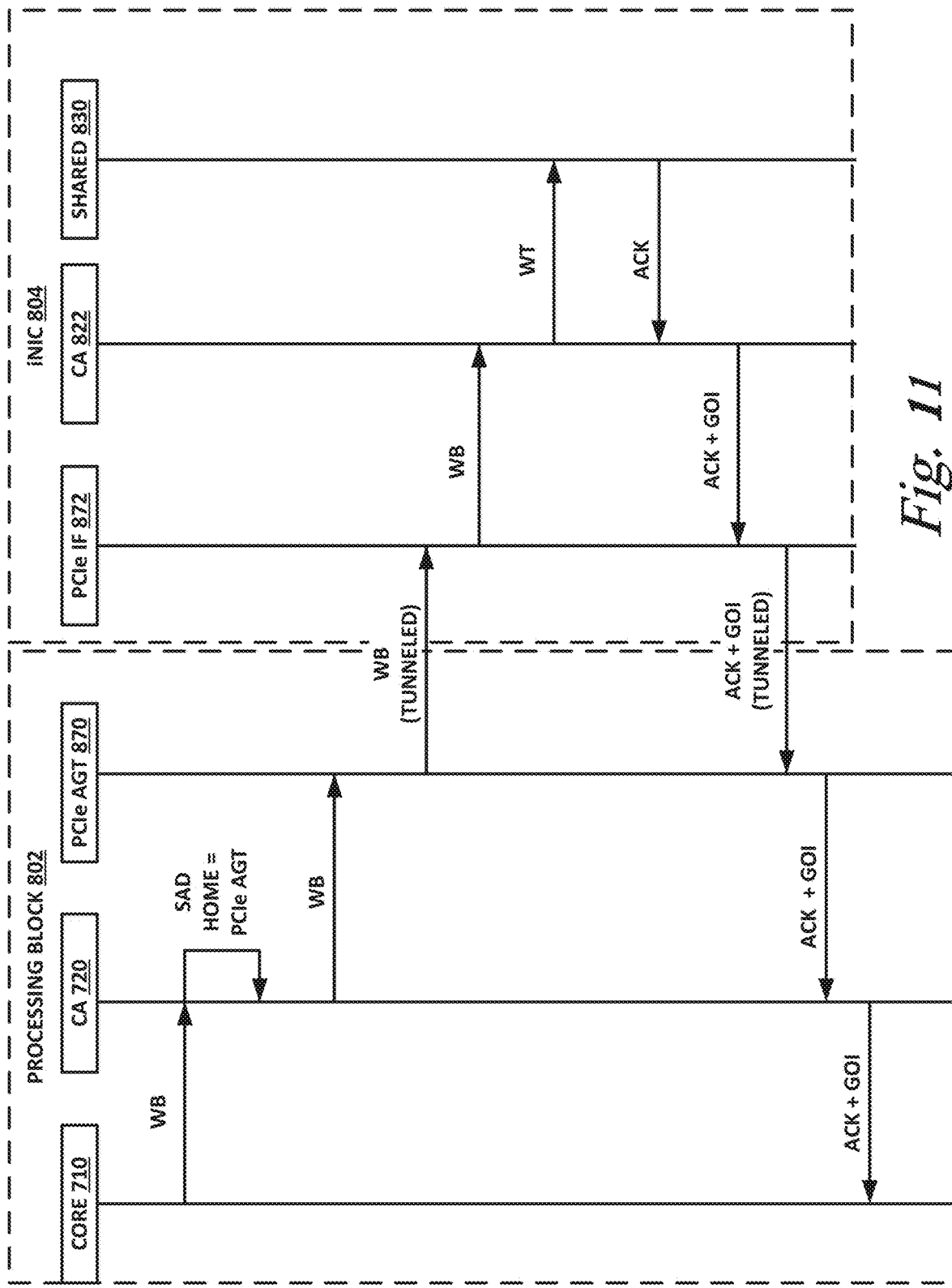
FIG. 11 illustrates a signal flow for a writeback according to one or more examples of the present specification.
Figure 12:
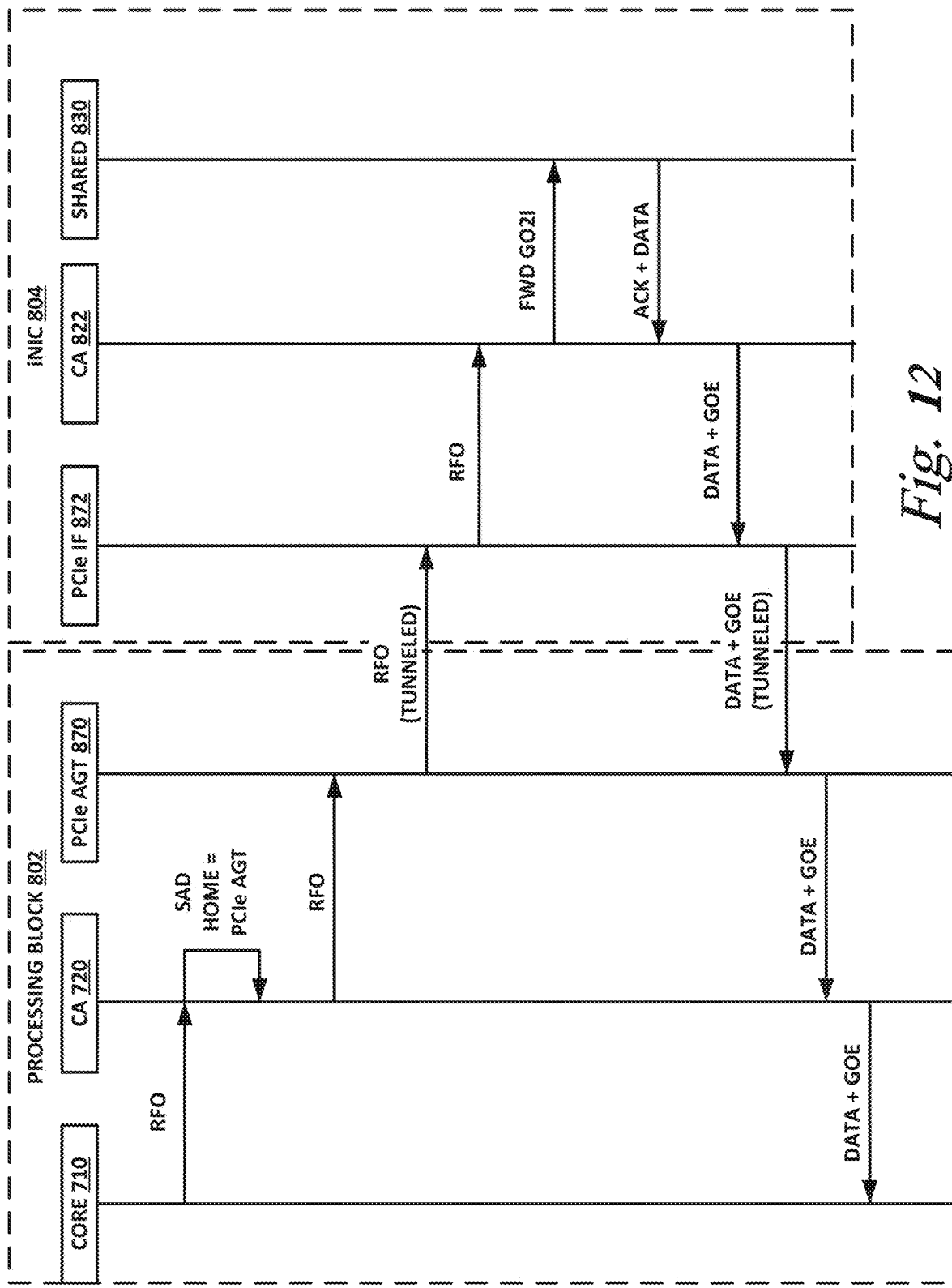
FIG. 12 illustrates a snoop flow according to one or more examples of the present specification.

FIGS. 10, 11, and 12 are signal flow diagrams illustrating signal flows according to one or more examples of the present specification. In each of these flow diagrams, signals may pass between a core 710, a caching agent 720, a PCIe agent 870, a host PCIe interface 872, a caching agent 822, and a shared memory space 830.

FIG. 10 illustrates a read flow (MESI Read For Ownership (RFO)) according to one or more examples of the present specification. In this example, the RFO may be generated by an application running on a core 710.

In this example, core 710 issues the read flow to caching agent 720. Caching agent 720 then assigns the PCIe agent as the SAD home of the read flow.

Caching agent 720 issues the read flow to PCIe agent 870. PCIe agent 870 tunnels the read flow to PCIe host interface 872. PCIe host interface 872 may detunnel the read flow, and issue it to caching agent 822.

Caching agent 822 issues a read instruction to shared memory space 830. Shared memory 830 then returns the data to caching agent 822.

Caching agent 822 issues the data plus the read return (MESI GOE) to PCIe interface 872.

PCIe interface 872 issues a tunneled data plus GOE to PCIe agent 870. PCIe agent 870 may detunnel the data plus GOE, and issue it to caching agent 720. Finally, caching agent 720 issues the data plus GOE to core 710.

FIG. 11 illustrates a signal flow for a writeback according to one or more examples of the present specification. The writeback (WB) naming convention is used by correlation to evictions in the core or Last Level Cache (LLC). However, this may also include other types of writeback to memory such as flush flows. Conceptually, this flow may cover data sent back from one of the cores 710 to shared memory 830.

Core 710 issues the writeback to caching agent 720. Caching agent 720 homes the writeback to the PCIe agent. Caching agent 720 then issues the writeback to PCIe agent 870.

PCIe agent 870 tunnels the writeback and issues a tunneled writeback to PCIe interface 872.

PCIe interface 872 detunnels the writeback and issues it to caching agent 822. Caching agent 822 then issues a write instruction to shared memory 830.

Shared memory 830 issues an acknowledgment (ACK) to caching agent 822. Caching agent 822 issues ACK plus MESI GOI to PCIe interface 872.

PCIe interface 872 tunnels the ACK plus GOI and issues it to PCIe agent 870.

PCIe agent 870 detunnels the ACK plus GOI and issues it to caching agent 720. Finally, caching agent 720 issues the ACK plus GOI to core 710.

FIG. 12 illustrates a snoop flow according to one or more examples of the present specification.

A "snoopy" cache is a cache that performs bus validation for cache coherency. When a memory address or datum is shared by a plurality of caches, it may be necessary to ensure that the caches remain coherent. When an agent makes a change to the shared datum, the change is propagated out to the other caches. Each cache may employ a "bus snooper," and each bus snooper monitors every transaction on the bus. When a transaction occurs modifying the shared datum, all snoopers check to see whether their respective caches have the same copy of the shared datum. If a cache has the correct shared datum, its snooper issues an action to ensure cache coherency, such as a flush or an invalidation of the cache block. The snooper may also invalidate the cache block, as appropriate.

A snoop may occur when a given line accessed by the core is currently used by coprocessor 708. Caching agent 822 may thus invalidate the line and send the data back to core 710. The same flow may also be used in the case where coprocessor 708 requests access to a line that is currently being used by one of the cores 710 in processing block 804. In this case, caching agent 822 may issue the snoop to the core of the node using the PCIe tunneling.

By way of example, core 710 issues an RFO to caching agent 720. Caching agent 720 homes the RFO to PCIe agent 870. Caching agent 720 then issues the RFO to PCIe agent 870. PCIe agent 870 tunnels the RFO and delivers it to PCIe interface 872.

PCIe interface 872 detunnels the RFO and issues it to caching agent 822. In this case, caching agent 822 determines that the line being accessed is currently used by coprocessor 708, and issues a snoop. Thus, caching agent 822 issues MESI FWD GO2I to shared memory 830.

Shared memory 830 issues ACK plus data back to caching agent 822.

Caching agent 822 issues data plus GOE back to PCIe interface 872.

PCIe interface 872 tunnels the data plus GOE, and issues it to PCIe agent 870.

PCIe agent 870 issues the data plus GOE to caching agent 720. Finally, caching agent 720 issues the data plus GOE to core 710.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a System-On-a-Chip (SoC), including a Central Processing Unit (CPU) package. An SoC represents an Integrated Circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

Note also that in certain embodiments, some of the components may be omitted or consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a Field Programmable Gate Array (FPGA), an Erasable Programmable Read Only Memory (EPROM), an Electrically Erasable Programmable Read Only Memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage may store information in any suitable type of tangible, nontransitory storage medium (for example, Random Access Memory (RAM), Read Only Memory (ROM), Field Programmable Gate Array (FPGA), Erasable Programmable Read Only Memory (EPROM), Electrically Erasable Programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms 'memory' and 'storage,' as appropriate. A nontransitory storage medium herein is expressly intended to include any nontransitory special-purpose or programmable hardware configured to provide the disclosed operations, or to cause a processor to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and their teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

Example Implementations

There is disclosed an example of a host-fabric interface (HFI), including: an interconnect interface to communicatively couple the HFI to an interconnect; a network interface to communicatively couple the HFI to a network; network interface logic to provide communication between the interconnect and the network; a coprocessor configured to provide an offloaded function for the network; a memory; and a caching agent configured to: designate a region of the memory as a shared memory between the HFI and a core communicatively coupled to the HFI via the interconnect; receive a memory operation directed to the shared memory; and issue a memory instruction to the memory according to the memory operation.

There is also disclosed an example, wherein the memory operation is received from the core.

There is also disclosed an example, wherein the memory operation is tunneled, and wherein the interconnect interface is to detunnel the memory operation.

There is also disclosed an example, wherein the memory operation is directed to the core.

There is also disclosed an example, wherein the interconnect interface is to tunnel the memory operation.

There is also disclosed an example, wherein the memory operation is a memory read.

There is also disclosed an example, wherein the memory operation is a memory write.

There is also disclosed an example, wherein the memory operation is originated by one of the coprocessor and the core, and wherein the caching agent is configured to determine that the memory operation is directed to a memory line currently in use by the other of the coprocessor and the host.

There is also disclosed an example, wherein the caching agent is to issue a snoop to invalidate the line.

There is also disclosed an example, wherein the caching agent implements a coherency protocol selected from a group consisting of MESI, MOSI, MOESI, and MOESIF.

There is also disclosed an example, wherein the interconnect interface comprises a dedicated channel for the memory operation, wherein the interconnect interface is to directly route traffic from the dedicated channel to the caching agent.

There is also disclosed an example, wherein the memory operation includes a hash to identify a home caching agent of the memory operation.

There is also disclosed an example of a caching agent, wherein the HFI comprises an integrated circuit separate from the core.

There is also disclosed an example, wherein the core comprises a caching agent configured to maintain cache coherency in the shared region of the memory.

There is also disclosed an example, wherein the core comprises a caching agent configured to maintain cache coherency in the shared region of the memory.

There is also disclosed an example of one or more tangible, non-transitory computer readable storage mediums having encoded thereon instructions for instructing an apparatus to: communicatively couple the apparatus to an interconnect; communicatively couple the apparatus to a network; provide network interface logic to provide communication between the interconnect and the network; and provide a caching agent to: designate a region of a memory as a shared memory between the apparatus and a core communicatively coupled to the apparatus via the interconnect; receive a memory operation directed to the shared memory; and issue a memory instruction to the memory according to the memory operation.

There is also disclosed an example, wherein the memory operation is directed to the core.

There is also disclosed an example, wherein an interconnect interface is to tunnel the memory operation.

There is also disclosed an example, wherein the memory operation is originated by one of a coprocessor and the core, and wherein the caching agent is configured to determine that the memory operation is directed to a memory line currently in use by the other of the coprocessor and the core.

There is also disclosed an example, wherein the caching agent is to issue a snoop to invalidate the line.

There is also disclosed an example, wherein the caching agent implements a coherency protocol selected from a group consisting of MESI, MOSI, MOESI, and MOESIF.

There is also disclosed an example, wherein the memory operation includes a hash to identify a home caching agent of the memory operation.

There is also disclosed an example of a host device, comprising: a processor; a memory; and a caching agent configured to: map a region of the memory to a shared memory of an intelligent network interface.

There is also disclosed an example of a host device, further comprising: logic for providing an interconnect; and logic for providing a dedicated channel for providing communication between a host processor and a shared memory of an intelligent network interface comprising network interface logic, a coprocessor, and a memory having a shared memory region, wherein the memory operation is directed to the host.

There is also disclosed an example of a host device, further comprising a system address decoder configured to receive memory operations from a plurality of intelligent network interfaces, and to provide a hash to home the memory operations.

What is claimed is:

1. A network interface, comprising:
a hardware bus interface circuit to communicatively couple the network interface to a host computer, wherein the host computer has a central processor unit (CPU);
a memory circuit comprising a shareable memory region that can be cache coherently mapped to an address space of the host computer;
a coprocessor circuit to provide an accelerated network support function via the shareable memory region; and
a caching agent (CA) circuit to maintain cache coherency between the coprocessor and the CPU via the shareable memory region.

2. The network interface of claim 1, wherein the network support function comprises encryption.

3. The network interface of claim 1, wherein the network support function comprises decryption.

4. The network interface of claim 1, wherein the network support function comprises compression.

5. The network interface of claim 1, wherein the network support function comprises decompression.

6. The network interface of claim 1, wherein the network support function comprises internet protocol security.

7. The network interface of claim 1, further comprising a bus interface to communicatively couple to the host computer.

8. The network interface of claim 7, wherein bus interface is a peripheral component interconnect express (PCIe) interface.

9. The network interface of claim 1, wherein the CA circuit is to coherently handle a memory write from the host computer to the shareable memory region.

10. The network interface of claim 1, wherein the CA circuit is to coherently handle a memory read from the shareable memory region to the host computer.

11. One or more non-transitory computer-readable media having stored thereon executable instructions to:
map a local memory location of a memory address space of a host device having a first caching agent (CA) to a memory region of a network interface having a second CA, wherein the network interface comprises a coprocessor circuit to provide an accelerated network support function that uses the memory region;
instruct the coprocessor circuit to perform the accelerated network support function;
write a first datum to the local memory location, comprising maintaining cache coherency between the memory address space and the memory region of the network interface; and
read a second datum from the local memory location, comprising maintaining cache coherency between the memory address space and the memory region of the network interface.

12. The one or more non-transitory computer-readable media of claim 11, wherein the network support function comprises encryption and/or decryption.

13. The one or more non-transitory computer-readable media of claim 11, wherein the network support function comprises compression and/or decompression.

14. The one or more non-transitory computer-readable media of claim 11, wherein the network support function comprises a security function.

15. The one or more non-transitory computer-readable media of claim 11, wherein the executable instructions are further to communicate with the network interface via a peripheral component interconnect express (PCIe) bus.

16. A computing apparatus comprising:
a local host comprising a processor circuit and a host memory addressable via an address space and a first caching agent (CA);
a network interface, comprising a coprocessor circuit to perform a network support function, a network interface memory comprising a region accessible by the coprocessor circuit, and a second CA;
a communication bus to communicatively couple the network interface to the processor circuit; and
a software driver for the network interface, comprising instructions encoded within the host memory to instruct the processor circuit to:
 map the region of the network interface memory to a location of the host memory;
 instruct the coprocessor circuit to carry out the network support function; and
 maintain read and write cache coherency between the region accessible by the coprocessor circuit and the location of the host memory.

17. The computing apparatus of claim 16, wherein the communication bus is a peripheral component interconnect express (PCIe) bus.

18. The computing apparatus of claim 16, wherein the coprocessor circuit is an application-specific integrated circuit.

19. The computing apparatus of claim 16, wherein the coprocessor circuit comprises a field-programmable gate array.

20. The computing apparatus of claim 16, wherein the coprocessor circuit comprises an intellectual property block.

21. The computing apparatus of claim 16, wherein the network support function comprises encryption.

22. The computing apparatus of claim 16, wherein the network support function comprises decryption.

23. The computing apparatus of claim 16, wherein the network support function comprises compression and/or decompression.

24. The computing apparatus of claim 16, wherein the network support function comprises a security function.

25. The computing apparatus of claim 16, wherein the communication bus is a peripheral component interconnect express (PCIe) bus.

* * * * *